United States Patent

Otto et al.

Patent Number: 5,674,155
Date of Patent: Oct. 7, 1997

[54] METHOD OF AND APPARATUS FOR TRANSMITTING TORQUE IN THE POWER TRAINS OF MOTOR VEHICLES

[75] Inventors: Dieter Otto, Achern-Oberachern; Thomas Pfund, Lauf; Klaus Herzog, Rheinmünster-Greffern; Anton Rink, Sinzheim-Leiberstung, all of Germany

[73] Assignee: LuK Gebriebe-Systeme GmbH, Bühl/Baden, Germany

[21] Appl. No.: 211,978

[22] PCT Filed: Aug. 21, 1993

[86] PCT No.: PCT/DE93/00765

§ 371 Date: Oct. 17, 1994

§ 102(e) Date: Oct. 17, 1994

[87] PCT Pub. No.: WO94/04852

PCT Pub. Date: Mar. 3, 1994

[30] Foreign Application Priority Data

| Aug. 21, 1992 | [DE] | Germany | 42 27 671.3 |
| Aug. 25, 1992 | [DE] | Germany | 42 28 137.7 |
| Oct. 17, 1992 | [DE] | Germany | 42 35 070.0 |

[51] Int. Cl.$^6$ .................. B60K 41/02; F16H 61/14
[52] U.S. Cl. ............... 477/176; 477/62; 477/169; 477/180; 192/3.3
[58] Field of Search ............... 477/62, 64, 65, 477/169, 175, 176, 180; 192/3.3

[56] References Cited

U.S. PATENT DOCUMENTS

| 4,577,737 | 3/1986 | Niikura et al. | 192/3.3 |
| 4,580,668 | 4/1986 | Pickard et al. | 192/3.3 |
| 4,725,951 | 2/1988 | Niikura | 477/65 |
| 4,969,545 | 11/1990 | Hayashi | 477/176 |
| 5,029,087 | 7/1991 | Cowan et al. | 364/424.1 |
| 5,226,513 | 7/1993 | Shibayama | 192/3.3 |

FOREIGN PATENT DOCUMENTS

| 31 30 871 A1 | 8/1981 | Germany | B60K 41/22 |
| 2 190 715 A | 11/1987 | Germany | B60K 41/22 |

*Primary Examiner*—Charles A. Marmor
*Assistant Examiner*—Sherry Lynn Estremsky
*Attorney, Agent, or Firm*—Darby & Darby

[57] ABSTRACT

A method of operating a torque transmitting system with a hydrodynamic power transmission and with a friction clutch, which constitutes a lock-up clutch and bridges the power transmission, involves controlling the lock-up clutch and the hydrodynamic power transmission so that clutch slip is present. The input torque furnished by a prime mover is divided into a torque which is to be transmitted by the power transmission and a torque which is to be transmitted by the lock-up clutch. The lock-up clutch includes an annular piston which is disposed between the cover and the turbine wheel of the power transmission. The radially outer portion of the piston constitutes a clutch disc and its radially inner portion is mounted on a complementary sealing hub. The power transmission is "soft" and exhibits a flat progress of the primary characteristic curve as well as a wide secondary characteristic curve, i.e., a wide torque conversion range.

45 Claims, 12 Drawing Sheets

PRIOR ART    Fig. 6
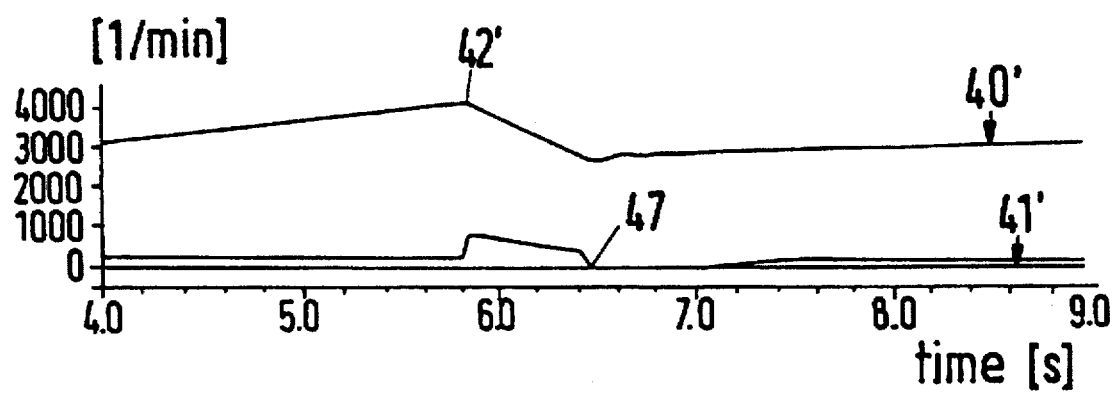
Fig. 7    PRIOR ART
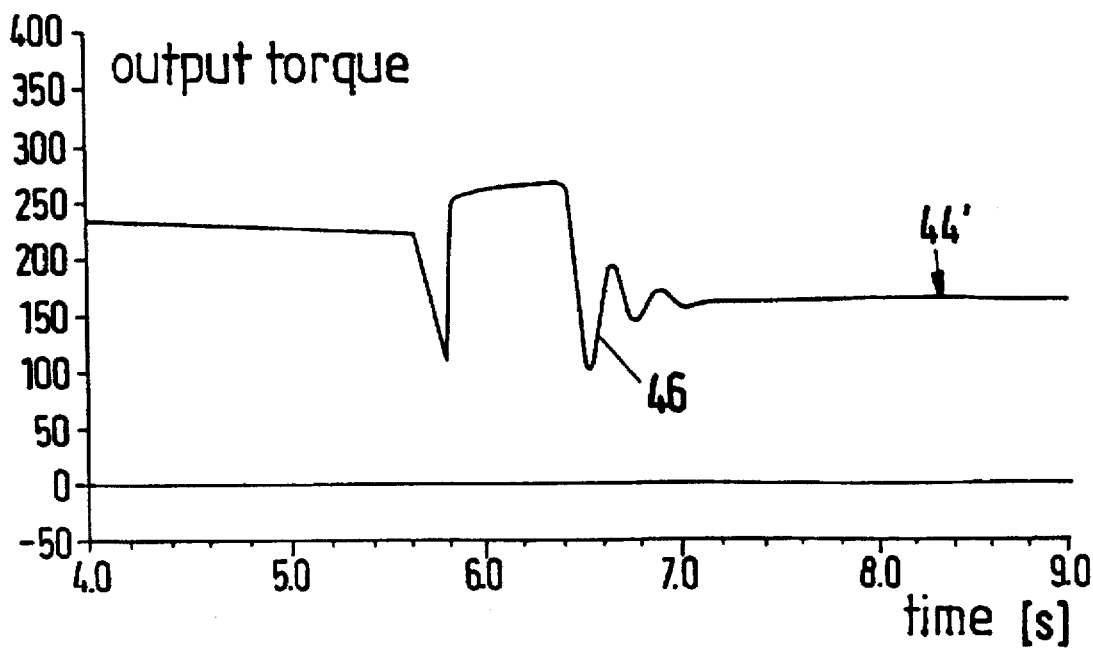

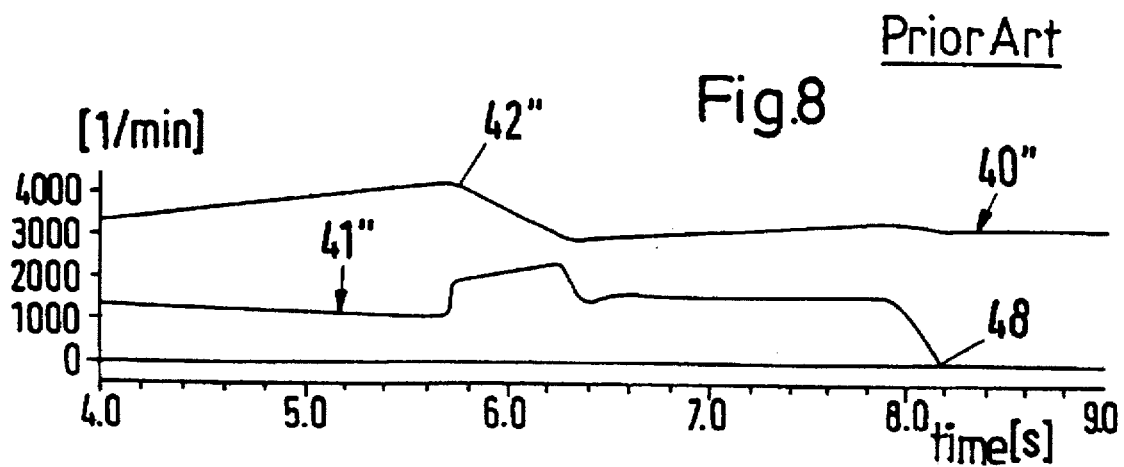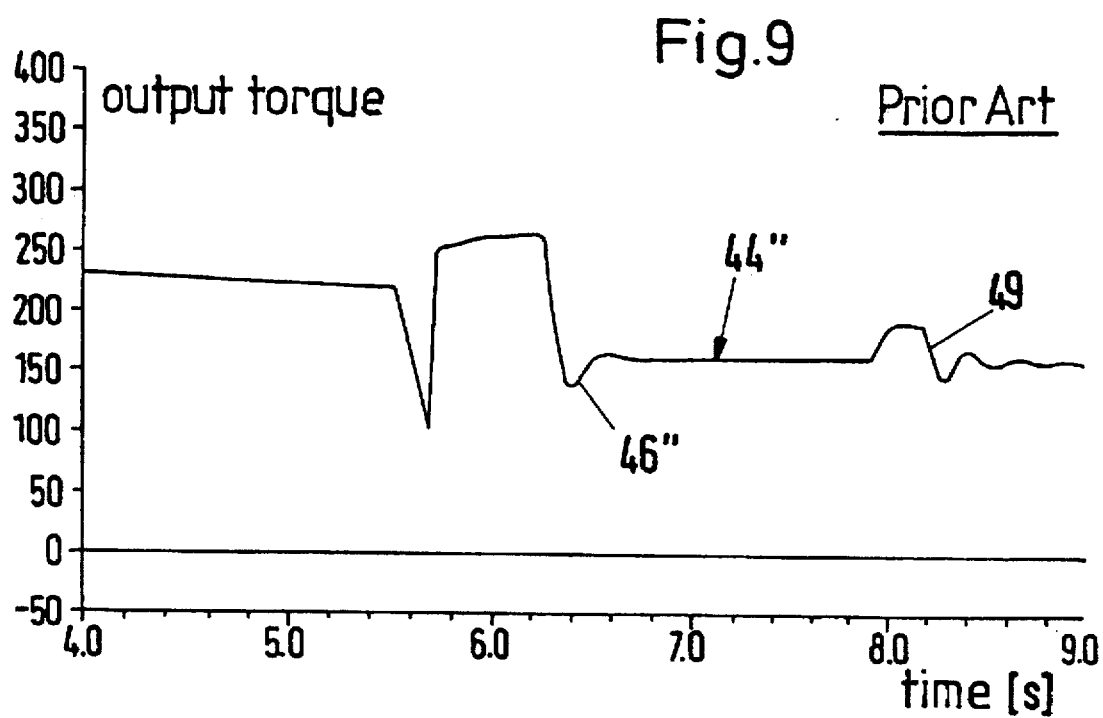

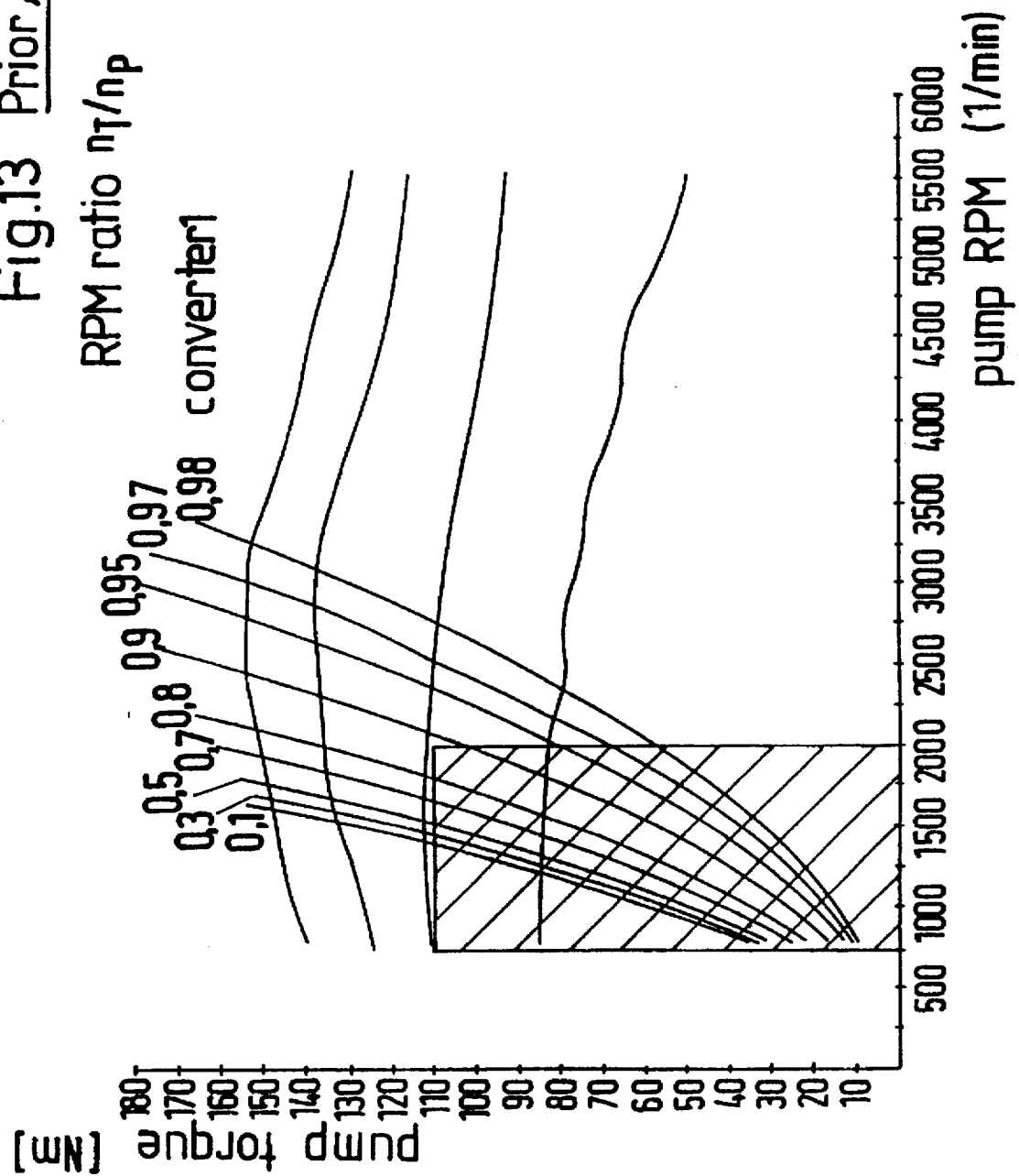

ns of Motor Vehicles

METHOD OF AND APPARATUS FOR TRANSMITTING TORQUE IN THE POWER TRAINS OF MOTOR VEHICLES

BACKGROUND OF THE INVENTION

The invention relates to a method of regulating a torque transmitting system which is operatively connected with the output of a prime mover, such as an internal combustion engine, and is drivingly connected with an automatic transmission by an output shaft. The system comprises a hydrodynamic power transmission, a friction clutch in parallel with the power transmission, a measured value detecting system and a central computer unit. The application of force to the friction clutch, and hence the torque which is being transmitted by the friction clutch, is designed to be or is purposefully made variable in cooperation with the central computer unit.

The invention further relates to a lock-up clutch for the hydrodynamic power transmission in a torque transmitting system of the above-outlined character. The hydrodynamic power transmission comprises a pump wheel, a turbine wheel, a guide wheel and a power transmission cover which is centered relative to the rotational axis, which is non-rotatably connected with the pump wheel and which surrounds or confines the turbine wheel. An annular piston which is centered between the cover of the power transmission and the turbine wheel has a radially outer portion provided with a conical friction surface and a radially inner portion constituting a sealing hub mounted on a complementary sealing hub which is non-rotatably connected with the turbine wheel.

Methods of regulating torque transmitting systems which involve selective adjustment of a pressure differential between the plenum chambers of a friction clutch, which is disposed in parallel with and bridges a hydrodynamic torque transmission or converter, and wherein the selective adjustment determines the magnitude of torque which is transmitted by the friction clutch, are known in the art.

For example, published German patent application No. 31 30 871 describes a regulating method in connection with a torque transmitting system of the above outlined character. The method involves a measurement of the slippage or slip between the input and the output, a comparison with predetermined desired magnitudes of slippage, and a compensation for detected differences, if any. The compensation involves a change of the pressure differential between the fluids in the two chambers of the friction clutch. Thus, the method involves a regulating procedure based on a conventional regulation of slip.

U.S. Pat. No. 5,029,087 also discloses a regulating method in connection with a hydrodynamic torque transmission or hydrokinetic torque converter which is disposed in parallel with a friction clutch. The patent proposes to determine the slip at the clutch, to compare the thus determined slip with predetermined magnitudes of slip, and to vary the pressure differential between the two plenum chambers of the friction clutch in response to detection of deviations of slip from predetermined values. Thus, here again, one deals with a typical regulation of slip which involves a compensation for detected deviations from predetermined values of slip.

U.S. Pat. No. 4,577,737 discloses a method of influencing a torque transmitting system of the above-outlined character. The patent proposes to directly monitor the transmission of torque by a hydrodynamic power transmission or converter by resorting to a torque sensor, and the transmission of torque is selected depending upon the operating conditions of the prime mover. The engagement of the friction clutch which bridges the hydrodynamic power transmission is regulated in such a way that one ensures the transmission of the required torque.

Of course, if one resorts to the just-outlined torque regulating method, the torque which is being transmitted by the power transmission and the resulting slip can be monitored and influenced only after they develop. To this extent, this method also involves a regulating principle which is related to the regulation of slip, even though the patented method involves influencing the torque which is to be transmitted by the power transmission.

It has been determined that the above-outlined systems for selective or directed influence on the torque which is being transmitted by the friction clutch in a system of the aforediscussed character are either unsatisfactory or not entirely satisfactory when put to actual use.

Thus, if one is to regulate the slip, a system can react to departures of the slip from a desired value subsequent to monitoring, i.e., when the undesirable slip already exists. This fact entails a number of drawbacks, especially in dynamic processes, and an attempt to eliminate one of these drawbacks can result in aggravation of other drawbacks or vice versa.

By way of example, a reduction of the torque which is being transmitted by the prime mover effects a reduction of the slip in the torque transmitting system. In order to avoid the condition of gripping of the friction clutch, and hence an unimpeded transmission of fluctuations of the torque which is being transmitted from the prime mover to the remaining parts of the power train, it is necessary to reduce the torque which is being transmitted by the friction clutch. However, in actual practice, the dynamics of a regulation are limited by delays and idle times so that it is necessary to provide a minimum slip RPM which, based on experience, cannot be reduced below 50 revolutions per minute.

Furthermore, when a vehicle is being operated, there develop situations when a regulator design which is optimized as to time is not desirable.

Depending on the distribution of rotating masses in a vehicle, the RPM at the input of the variable speed transmission, and hence at the output of the torque transmitting system, is reduced during shifting into a higher gear while the RPM at the output of the variable speed transmission remains relatively constant. A reduction of the RPM at the output of the torque transmitting system entails an increase of slip which, in turn, due to the nature of the operation of the hydrodynamic torque transmission, necessitates an increase in the torque at the input of the torque transmitting system. However, such increased torque is not made available by the prime mover at that particular time. Accordingly, the prime mover is braked and a slip is established automatically at a low level when the action upon the friction clutch is held at a constant value during shifting into a higher gear. A regulator whose mode of operation as far as the time element is concerned is optimal will attempt to oppose an increase of slip by increasing the force which is being applied to the friction clutch which, in turn, results in a gripping of the friction clutch upon completion of the shifting operation so that any irregularities of torque from the prime mover are transmitted to the remainder of the power train.

Finally, German Pat. No. 37 12 223 already proposes a regulating method for a torque transmitting system of the aforementioned character according to which, during a predetermined range of vehicle speeds, the clutch engagement force is regulated, depending upon the extent to which the throttle valve is opened, in such a way that a slip can develop between the input and the output. In contrast to the previously discussed regulation of slip, this German patent discloses a regulation which selects an application of force to the friction clutch that depends upon an anticipated degree of opening of the throttle valve and according to which the slip between the input and the output of the torque transmitting system is dependent upon such application of force.

However, a drawback of such regulation is that the torque which is being transmitted by the friction clutch depends not only upon the clutch engaging force, but also upon the friction coefficient of the friction lining which, in turn, is subject to pronounced fluctuations depending upon the temperature, the slip RPM, the nature of the utilized oil and other influences. This is known in the art. In other words, the just discussed mode of regulation also necessitates adherence to a minimum slip RPM in order to ensure a slip RPM which is sufficiently high to effect an insulation of oscillations even at pronounced fluctuations of the performance of the system.

All heretofore known systems share the drawback that one can operate only with a relatively high minimum slip RPM of more than 50 revolutions per minute. On the other hand, this does not bring about any appreciable advantages as far as fuel consumption is concerned, if one compares such a mode of regulation with those for a non-bypassed hydrodynamic torque converter and, moreover, the losses in output that develop at the friction clutch are not readily controllable.

OBJECTS OF THE INVENTION

It is an object of the invention to provide an improved method of regulating a torque transmitting system which renders it possible to select slip RPMs which are considerably lower than 50 revolutions per minute under all circumstances in actual use of a vehicle with a hydrodynamic power transmission or converter followed by an automatic variable speed transmission.

It is already well known to employ friction clutches which serve to bypass a hydrodynamic torque transmission in a torque transmitting system of the above-outlined character. In lock-up clutches having plane friction surfaces, the friction radius is dependent upon the application of pressure and, in view of its relatively low rigidity, such construction does not ensure a uniform distribution of pressure over the entire friction lining. This leads to partial overheating of the friction lining in slip clutches which, in turn, leads to a destruction of the friction linings as well as of the oil (automatic transmission fluid=ATF) which is utilized at such locations.

Furthermore, the torque which can be transmitted by a friction clutch is directly dependent upon the radius of the friction surface which, in conjunction with the oil pressure available in an automatic transmission, necessitates a minimal amount of space as seen in the radial direction.

However, a lock-up clutch of the afore-described character for use in hydrodynamic power transmissions requires a larger axial space for installation in a vehicle, and such space is not available in many types of vehicles, particularly when the piston damper unit must employ elastic damper means having a large radius. Such mechanical damper means are necessary in order to ensure an optimum insulation of oscillations, even at low slip RPMs, also in regions where the prime mover causes the generation of highly pronounced oscillations.

With the above-outlined state of prior art in mind, a further object of the invention is to provide an improved lock-up clutch of the afore-described character and for the afore-described purposes.

SUMMARY OF THE INVENTION

As concerns the regulating method, the object of the invention is accomplished in that the torque which is to be transmitted by the friction clutch is determined in dependence upon the torque of the prime mover, and the application of force to the friction clutch necessary for transmission of the required clutch torque is computed and adaptively selected, whereby a minimal slip between the input and the output of the torque transmitting system in dependence upon the magnitude of the computed clutch torque develops in an automatic way, and the method further involves long-range correction of departures from an ideal condition.

The invention involves a division of input torque into a hydraulic part which is to be transmitted by the hydrodynamic power transmission and a mechanical part which is to be transmitted by the friction clutch. Infinite or stepless regulation is achieved by applying to the lock-up clutch a variable force which is regulated by an intelligent control system in such a way that an optimal division into converter torque and lock-up torque is achieved for each and every situation which develops when the vehicle is in use.

A characteristic feature of the novel regulating method is that the friction clutch will operate with slip during each and every stage of operation of the torque transmitting system and the friction clutch is not regulated in dependency upon slip, but rather depending upon the torque. The slip is then adjusted in an automatic way and a correction of the torque to be transmitted is preceded by a slow regulation or adaptation of slip. The friction clutch which bypasses the converter is not disengaged during shifting into different gears, but continues to be adjusted in dependence upon the torque. An upwardly sloping characteristic friction curve is of assistance for the regulation of torque. The friction coefficient preferably increases in response to increasing slip, and the static or blocking friction coefficient should be less than the slip coefficient.

In accordance with a further preferred development of the invention, the torque which is to be transmitted by the friction clutch is ascertained in dependence upon the torque of the prime mover in accordance with the torque equation $$M_{clutch} = k_{mc} \cdot k_{korr} \cdot (M_{prime\ mover} + M_{korr\_MOT}) + M_{korr\_w\ddot{u}}$$

wherein $M_{clutch}$ is torque at the friction clutch, $k_{mc}$ is the torque division factor ($0 \leq k_{mc} \leq 1$), $k_{korr}$ is a correction factor for compensation of multiplicatively developing errors, $M_{korr\_MOT}$ is a correction torque for compensation of errors developing in addition to the engine torque, and $M_{korr\_w\ddot{u}}$ is a correction torque for compensation of errors developing in addition to the clutch torque with attendant automatic development of minimal slippage or slip between the input and the output of the torque transmitting system in dependence upon the magnitude of the torque division factor $k_{mc}$ which is constant within the entire operating range of the power train. Departures from ideal condition are subject to long-range correction with the correction factor $k_{korr}$ and correction torques $M_{korr\_MOT}$ and $M_{korr\_w\ddot{u}}$.

In accordance with this further development of the regulating method, one obtains a value for the slip of the friction clutch bypassing the converter which can be kept low by selection of factors $k_{mc}$ and $k_{korr}$. Within certain ranges, such as for example when the RPM is low but the load is large (this is a situation when many combustion engines exhibit a weakness as far as the torque is concerned), the factors should be selected in such a way that the torque which is to be transmitted by the friction clutch should be as low as possible in order to establish a higher RPM difference. This ensures that, within the particularly important operating ranges, especially in conjunction with a soft converter and a large conversion factor, one achieves an increase of the output torque which creates the impression of a higher torque of the prime mover.

Thus, the novel regulating method is characterized by satisfactory insulation of oscillations at a low slip, by more satisfactory reactions in the power train during gear shifting and during changes of load, as well as by higher acceleration reserves. At the same time, it is possible to employ smaller and/or flatter hydrodynamic power transmissions or torque converters which is of importance in motor vehicles with front wheel drives and transversely installed combustion engines. Lastly, one achieves significant savings in fuel consumption because, in accordance with the novel method, the converter is bypassed by the friction clutch irrespective of the selected gear ratio.

The torque division factor $k_{mc}$ which is resorted to in connection with certain novel torque relationships can constitute a value which is dependent upon the output RPM, upon the RPM of the prime mover, solely upon the RPM of the prime mover, upon the RPM as well as upon the torque of the prime mover, or upon the output RPM and the torque of the prime mover. Thus, the RPM of the prime mover also constitutes an important indicator for the factor $k_{mc}$, namely either alone or in combination with the torque which is being transmitted by the prime mover.

It is desirable for the construction and operation of the torque transmitting system and for the carrying out of the method, if the friction clutch is actuatable by pressurized fluid and is constructed in such a way that two separate plenum chambers develop between the friction clutch and the cover of the hydrodynamic power transmission or converter on the one hand and between the friction clutch and the remaining part of the housing of the power transmission or converter on the other hand. The torque which is to be transmitted by the friction clutch is determined by the pressure differential which exists between the two chambers.

In accordance with another desirable further development of the invention, the operating condition of a torque transmitting system wherein the prime mover is a combustion engine is determined in dependence upon the engine RPM and the angle of the throttle valve, in dependence upon the engine RPM and the subatmospheric pressure in the engine manifold, or in dependence upon engine RPM and the injection time. In accordance with the just enumerated alternatives, the indicator of the operating condition is always the RPM of the engine in conjunction with a further parameter, such as the angle of the throttle valve, the subatmospheric pressure in the engine manifold or the injection time.

Due to the dynamic behavior of hydraulic and mechanical systems, an overly rapid increase of the magnitude of a parameter which influences the division of torque to be transmitted by the torque transmitting system between the converter and the friction clutch can induce the development of oscillations having different frequencies and being attributable to excessive acceleration or to gripping of the friction clutch.

In order to avoid such a development of oscillations, an advantageous further development of the invention provides that the selection of a freshly computed value of a parameter which influences the division of the torque to be transmitted by the torque converter and the friction clutch, which departs from the previously computed value and which preferably constitutes a pressure differential, be carried out with a delay in accordance with a function depending on time.

The selection of a freshly computed value of a parameter which influences the division of torque to be transmitted between the converter and the friction clutch, which departs from the previously computed value and which preferably constitutes a pressure differential can, however, also be carried out with a delay in accordance with a function depending upon the difference between the RPM of the input and the output of the torque transmitting system.

It is equally possible to select a freshly computed value of a parameter which influences the division of the torque to be transmitted between the converter and the friction clutch and departs from the previously computed value with a delay in accordance with a function depending upon the gradient of the engine RPM.

In accordance with still another further development of the invention, and if the utilized friction clutch is actuatable by pressurized fluid, the pressure differential which is desired at the friction clutch can be selected with assistance from a PI- or PID regulator when the adjustment range from the pressure differential which is required to achieve a predetermined torque to be transmitted by the friction clutch to the developing pressure differential is incapable of unequivocal analytic description.

However, it is also possible to select the desired pressure differential at the friction clutch by obtaining from a characteristic curve a signal which is proportional to pressure and can denote, for example, the flow through a valve, and by compensating for the developing differences between the desired and actual pressure by means of an I-feedback when the adjustment range from the pressure differential which is required to achieve a predetermined torque to be transmitted by the friction clutch to the developing pressure differential is incapable of unequivocal analytic description. Alternatively, the desired pressure differential at the friction clutch can be selected by computing with assistance from a PI-, I- or PID-regulator a signal which is proportional to the desired pressure differential and is indicative of a flow or of a monitoring ratio.

A further important embodiment of the method provides that departures of the torque which is actually transmitted by the friction clutch from the desired torque be determined by measuring the slip which develops between the input and the output of the torque transmitting system and that the measured slip be compared with desired values. However, in accordance with a further development, such departures can also be determined by ascertaining the torque which is being transmitted by the torque converter on the basis of the characteristic of the torque converter to thus monitor the actual division of torque between the converter and the friction clutch. Finally, the departure of torque which is actually transmitted by the friction clutch from the desired torque transmission can be related to multiplicatively developing errors, to errors developing additively to the engine torque, to errors developing additively to the clutch torque, to errors developing multiplicatively and additively to the engine torque, to errors developing multiplicatively and additively to the clutch torque or to errors developing multiplicatively and additively to the engine torque as well as to the clutch torque. Such errors are compensated for with a time constant of several seconds in order to achieve a purely adaptive character of regulation.

Another embodiment of the method is characterized in that, in response to the transmission of a signal denoting the driver's or operator's desire for acceleration, which is preferably determinable by the velocity of change of the angle of the throttle valve, the slip in the torque transmitting system is increased by reducing the $k_{mc}$-factor so that the increase of the torque offered by the converter can be utilized as an additional reserve of torque.

Finally, and in accordance with a further modification of the method, the slip in the torque transmitting system is determined by the friction clutch for all speed ratios so that the efficiency of the converter transmission output is pushed into the background to thus permit a design of the power transmission which ensures a high stall-speed RPM and a wide power transmission range. In this manner, the reserve of available torque can be increased considerably by selective increase of the slip in the torque transmitting system.

The object concerning the provision of an improved lock-up clutch is accomplished by providing a clutch which is adapted to be operated by a pressurized fluid medium and comprises a pump wheel, a turbine wheel, a guide wheel and a torque converter cover. The cover is centered relative to the rotational axis, is non-rotatably connected with the pump wheel and surrounds the turbine wheel. An annular piston is disposed and centered between the cover of the torque converter and the turbine wheel has a radially outer portion constituting a conical clutch disc, all as will be described in greater detail hereinbelow. The radially inner portion of the annular piston can constitute a sealing hub which is mounted on a complementary sealing hub that is non-rotatably connected to the turbine wheel.

A further basic concept of the invention is embodied in a method of regulating a torque transmitting system which is operatively connected with the output of a prime mover, such as a combustion engine, and is drivingly connected with an automatic transmission by an output shaft. The system comprises a hydrodynamic torque transmission or torque converter, and a friction clutch installed in parallel with the torque converter, operated by pressurized fluid and having two plenum chambers disposed between a turbine wheel of the converter and a converter cover. The clutch is designed in such a way that a pressure differential existing between these plenum chambers determines the torque which can be transmitted by the friction clutch. The torque transmitting system further comprises a measured value detecting system, a central computer unit and a hydraulic system which cooperates with the computer unit to achieve a selective change of the pressure differential between the two plenum chambers and hence a selective change of the torque which can be transmitted by the friction clutch.

Methods of regulating the operation of torque transmitting systems according to which selective adjustment of the pressure differential between the plenum chambers of a friction clutch, which is installed in parallel with and bypasses a torque converter, is utilized to determine the magnitude of torque to be transmitted by the friction clutch are known in the art.

For example, the published German patent application No. 31 30 871 describes, in connection with a torque transmitting system of the above-outlined character, a regulating method according to which the magnitude of slip between the input and the output is measured, compared with predetermined values of slip and the thus determined differences, if any, are eliminated by appropriate regulation. The regulation is carried out in such a way that the difference between the pressures of the fluids in the two plenum chambers of a friction clutch are altered. Thus, one deals here with a regulating method which is based on a conventional regulation of slip.

U.S. Pat. No. 5,029,087 also discloses a regulating method for torque converters which are connected in parallel with friction clutches. The method involves the steps of measuring the slip at the clutch, comparing the measured slip with predetermined slip values, and altering the pressure differential between the two chambers of the friction clutch depending upon the detected departures of pressure differentials from a desired pressure differential. Thus, such method also involves a typical regulation of slip which compensates for detected departures of monitored slip from predetermined values of slip.

Lastly, U.S. Pat. No. 4,577,737 also discloses a method of influencing a torque transmitting system of the above-outlined character according to which the transmission of torque by a converter is monitored directly by a torque sensor and the transmission of torque is selected depending upon the operating condition of the prime mover. The engagement of a friction clutch which bypasses the converter is selected in such a way that one ensures the required transmission of torque.

Of course, torque which is being transmitted by the converter in accordance with the just-described patented method can be measured and influenced only while it is being actually transmitted, the same as the developing slip. Accordingly, this method is also based on a regulating concept which is akin to the regulation of slip, even though such method involves the determination of torque which is to be transmitted by the converter.

Those regulations of slip which involve a measurement of the difference between the output RPM of a prime mover and the input RPM of a transmission which is driven by a torque transmitting system or a measurement of a value corresponding to such difference of RPM, followed by a comparison with desired values and by undertakings to counteract the departures, if any, of actual values from the desired values have been found to be less than entirely satisfactory.

For example, the difference between the numbers of revolutions per minute varies as a result of changes of torque during shifting into different gears. The regulation of RPM then takes place with a considerable delay which causes the development of excessive oscillations of output torque and torque which is being transmitted to an automatic transmission. Furthermore, if a gear shift takes place at the end of a gear shifting operation, the friction clutch which bypasses the converter is likely to grip. Consequently, it is necessary to disengage the friction clutch in the course of a gear shifting operation. The regulation of slip involves an attempt to maintain the difference between the output RPM of the prime mover and the input RPM at the transmission at a desired value in the course of a gear shifting operation, i.e., the regulation operates counter to the transmission which receives torque from the torque transmitting system.

Accordingly, an object of the invention is to provide an improved method of regulating a torque transmitting system which comprises a torque converter, a friction clutch which bypasses the converter and a following automatic transmission, and to provide improved mechanical components, such as an improved converter and an improved friction clutch, which can be utilized with particular advantage at least in combination with other novel concepts of the present invention.

That object of the invention which pertains to the regulating method is accomplished in that, in a regulating method as outlined above, the torque to be transmitted by the friction clutch is ascertained in dependence upon the operating condition of the prime mover in accordance with the torque equation $M_{clutch}=k_c \times k_{korr} \times M_{prime\ mover}$, wherein $k_c=k_{mc}$ constituting a torque division factor, and $k_{korr}$ is a correction factor, and the application of that force to the friction clutch which is required for the transmission of a predetermined clutch torque is computed and selected so that the slip between the input and the output of the torque transmitting system is automatically determined in dependence upon the torque division factor $k_c$ and the correction factor $k_{korr}$ compensates for departures of any or each specific power train from an ideal condition.

A further basic inventive concept resides in the provision of a method of regulating a torque transmitting system which is operatively connected with the output of a prime mover, such as a combustion engine, and is drivingly connected with an automatic transmission by an output shaft, which comprises a hydrodynamic power transmission or torque converter, a friction clutch in parallel with the converter, a measured value detecting system and a central computer unit, and wherein the application of force to the friction clutch, and hence the torque which is being transmitted by the friction clutch, is designed to be variable in cooperation with the central computer unit. The torque to be transmitted by the friction clutch in dependence upon the operating condition of the prime mover is ascertained in accordance with the torque equation $$M_{clutch}=k_c \times k_{korr} \times M_{prime\ mover}$$

wherein $k_c=k_{mc}$ constituting a torque division factor and $k_{korr}$ is a correction factor. The application to the friction clutch of that torque which is required for the transmission of a predetermined clutch torque is computed and selected so that the slippage between the input and the output of the torque transmitting system is automatically determined in dependence upon the magnitude of the torque division factor $k_c$ which is constant for the entire operating range of the power train, and the correction factor $k_{korr}$ which compensates for deviations of each or any specific power train from an ideal condition.

The invention also relates to a method of regulating a torque transmitting system which is operatively connected with the output of a prime mover, such as a combustion engine, and is drivingly connected with an automatic transmission by an output shaft, the torque transmitting system comprising a hydrodynamic power transmission or torque converter, a friction clutch in parallel with the converter, a measured value detecting system and a central computer unit. The application of force to the friction clutch, and hence the torque which is being transmitted by the friction clutch, is designed to be variable in cooperation with the central computer unit. The torque to be transmitted by the friction clutch in dependence upon the operating condition of the prime mover is ascertained in accordance with the torque equation $M_{clutch}=k_c \times k_{korr} \times M_{prime\ mover}$ wherein $k_c=k_{mc}$ constituting a torque division factor and $k_{korr}$ is a correction factor. The application to the friction clutch of that force which is required for the transmission of a predetermined clutch torque is computed and selected so that the slip between the input and the output of the torque transmitting system is automatically determined in dependence upon the magnitude of the torque division factor $k_c$, which is independent from the characteristic diagram of the prime mover, and the correction factor $k_{korr}$ compensates for deviations of any or each specific power train from an ideal condition.

The object underlying the invention can also be accomplished by the provision of a method of regulating a system which is operatively connected with the output of a prime mover, such as a combustion engine, and is drivingly connected to an automatic transmission by an output shaft, and which comprises a hydrodynamic power transmission or torque converter, a friction clutch in parallel with the converter, a measured value detecting system and a central computer unit. The application of force to the friction clutch, and hence the torque which is being transmitted by the friction clutch, is designed to be variable in cooperation with the central computer unit. The torque to be transmitted by the friction clutch in dependence upon the operating condition of the prime mover is ascertained in accordance with the torque equation $M_{clutch}=k_c \times k_{korr} \times M_{prime\ mover}$ wherein $k_c=k_{mc}$ constituting a torque division factor and $k_{korr}$ is a correction factor. The application to the friction clutch of that force which is required for the transmission of a predetermined clutch torque is computed and selected so that the slip between the input and the output of the torque transmitting system is automatically determined in dependence upon the magnitude of the torque division factor $k_{mc}$ which is dependent exclusively upon the RPM of the prime mover, and the correction factor $k_{korr}$ which compensates for deviations of any or each specific power train from an ideal condition.

A further possibility of accomplishing the object resides in the provision of a method of regulating a torque transmitting system which is operatively connected with the output of a prime mover, such as a combustion engine, and is drivingly connected with an automatic transmission by an output shaft, which comprises a hydrodynamic power transmission or torque converter, a friction clutch in parallel with the converter, a measured value detecting system and a central computer unit. The application of force to the friction clutch, and hence the torque which is being transmitted by the friction clutch, is designed to be variable in cooperation with the central computer unit. The torque to be transmitted by the friction clutch in dependence upon the operating condition of the prime mover is ascertained in accordance with the equation $$M_{clutch}=k_c \times k_{korr} \times M_{primer\ mover}$$

wherein $k_c=K_{mc}$ constituting a torque division factor and $k_{korr}$ is a correction factor. The application to the friction clutch of that force which is required for the transmission of a predetermined clutch torque is computed and selected so that the slip between the input and the output of the torque transmitting system is automatically determined in dependence upon the magnitude of the torque division factor $k_c$ which is a function of the RPM and of the torque of the prime mover, and the correction factor $k_{korr}$ compensates for deviations of each or any specific power train from an ideal condition.

The invention involves a division of the input torque into a hydraulic part which is to be transmitted by the converter and a mechanical part which is to be transmitted by the friction clutch. In order to achieve infinite regulation, the lock-up clutch is acted upon by a variable force which is regulated by an intelligent control system in such a way that an optimal division into converter torque and lock-up torque is arrived at for each driving condition.

It can be of advantage for the construction and the mode of operation of the torque transmitting system and for the realization of the method if the friction clutch is actuatable by a flowing pressurized fluid and is constructed in such a way that two separate plenum chambers develop between the friction clutch and the cover of the torque converter on the one hand and the friction clutch and the remainder of the converter housing on the other hand, and if the torque which is being transmitted by the friction clutch is determined by the pressure differential existing between the two chambers.

Thus, it is characteristic of the novel regulating method that the friction clutch can slip within each operating range and that the operation of the friction clutch is not regulated in dependence upon slip, but rather in dependence upon the torque. This results in automatic selection of the slip and the correction of the transmitted torque involves a gradual regulation of slip. The friction clutch, which bridges or bypasses the torque converter, is not disengaged during shifting into different gears but continues to be regulated in dependence upon the torque. It is of assistance for the regulation of torque if the characteristic friction curve slopes upwardly. Furthermore, the friction coefficient preferably increases in response to increasing slip, and the static friction coefficient is preferably smaller than the dynamic friction coefficient.

In accordance with the regulating method of the present invention, the extent of slip of the friction clutch which bridges the converter can be maintained at a low value by appropriate selection of the factors $k_c$ and $k_{korr}$. Within certain ranges, such as when the RPM is low but the load is high (this is the range where the torque constitutes a weak point of many combustion engines), the factor is to be selected in such a way that the torque to be transmitted by the friction clutch is so low that it entails the establishment of a higher RPM differential. Especially in cooperation with a soft torque converter and a large conversion, one obtains an increase of the output torque in particularly important operational ranges which creates the impression of a higher torque of the prime mover.

Thus, the novel regulating method is characterized by satisfactory insulation of oscillations when the slip is low, more satisfactory reactions in the power train during shifting into different gears and in the event of changes of load, as well more satisfactory acceleration reserves while at the same time permitting the utilization of smaller and/or flatter torque converters, which is of importance in motor vehicles with front wheel drive and a transversely extending combustion engine. Furthermore, one achieves a significant advantage as regards the fuel consumption because, in accordance with the novel method, the converter is bypassed or bridged by the friction clutch at all speed ratios.

In accordance with an advantageous further development of the invention, in a transmission system having a prime mover which is a combustion engine, the condition of the prime mover can be determined in dependence upon the engine RPM and the angle of the throttle valve, in dependence upon the engine RPM and the subatmospheric pressure in the suction manifold, or in dependence upon the engine RPM and the injection time. In connection with the above enumerated alternatives, the indicator of the operating condition always includes the engine RPM in conjunction with another value, such as the angle of the throttle valve, the subatmospheric pressure in the suction manifold or the injection time.

A further advantageous development provides that the factor $k_c$ of the relationship of torques be a parameter which is constant within the entire operating range and depends solely upon the RPM of the prime mover or upon the RPM as well as the torque of the prime mover. The RPM of the prime mover further constitutes an important indicator for the factor $k_c$, namely either alone or in conjunction with the torque which is being transmitted by the prime mover.

In accordance with a further embodiment, the novel regulating method can also be characterized in that a torque which has been determined by the central computer unit in dependence upon a change of torque of the prime mover, which torque is to be transmitted by the friction clutch and which deviates from the momentary torque, may be selected by determining in advance the value of a selected parameter X which is desired after the elapse of a monitoring interval at an instant $t_{n+1}$ and which determines the torque being transmitted by the friction clutch. Parameter X is determined in accordance with a function which excludes undesired events, such as for example gripping of the friction clutch, or by computing the gradient $\Delta X$ which is required in order to arrive at the desired value of the parameter X after the elapse of the time interval $\Delta t$, or by incorporating the computed gradient $\Delta X$ by means of the hydraulic system, and by repeating the preceding series of steps to reach a desired value $X_{Soll}$. The method which includes the aforementioned steps can be characterized with particular advantage in that the parameter constitutes the pressure differential $\Delta P$ between plenum chambers of the clutch and is determined in advance by resorting to a proportionality regulation according to the equation $$\Delta P_{n+1} = (1-\beta) \times \Delta P_{Soll} + \beta \times \Delta P_n, \text{ wherein } \beta = f(T_{v,t}).$$

Alternatively, a new value of the torque being transmitted by the friction clutch which has been determined by the central computer unit in dependence upon a change of the torque in the power train can be selected by computing the gradient $\Delta X$ of a selected parameter, which determines the torque being transmitted by the friction clutch, in accordance with a function which excludes undesired events, such as for example short-lasting gripping of the friction clutch, or by applying the desired gradient $\Delta X$ by the hydraulic system, and by repeating the series of steps in order to reach the required desired value $X_{Soll}$. In such a modified embodiment, the gradient of the pressure differential $\Delta P$ between the plenum chambers of the clutch can constitute the parameter and can be computed in accordance with the equation $\Delta \Delta P = C_1 \times (\Delta P_{Soll} - \Delta P_n)$. In this equation, $\Delta \Delta P = C_1 \times (\Delta P_{Soll} - \Delta P_{1,st})$, $\Delta \Delta P$ is a change of pressure differential $\Delta P$ during the next following time interval, $\Delta P_{Soll}$ is the desired pressure differential, $\Delta P_n$ is the actual pressure differential at the time interval $t_n$, and $C_1$ is a proportionality or amplification factor wherein $0 \leq C_1 \leq 1$.

The amplification factor $C_1$ determines the velocity at which the difference between $\Delta P_{Soll}$ and $\Delta P_n$ is eliminated.

Threshold values: $C_1 = 0$, $C_1 = 1$.

If $C_1$ were zero, no equalization would take place because the pressure increase $\Delta \Delta P$ during the next computation interval would equal zero.

$C_1$ equals a jump of the desired value because the entire departure between the desired value and the starting value $(\Delta P_{Soll}, \Delta P_{Start})$ would have to be completed within a single time interval. Thus, the two threshold values are of purely theoretical significance. The range $0 < C_1 < 1$ is important. This range influences the velocity at which a departure between a desired value and an actual value takes place. The equalization takes longer if $C_1$ is smaller.

An advantage of such a mode of compensation for a difference between the desired and actual values is that, when the difference between the desired and actual values is pronounced, the method provides for a large adjustment value, i.e., a large value for ΔΔP. If the actual value is closer to the desired value, the value of ΔΔP becomes smaller and one achieves a "soft" progress of the desired value into the actual value. In this manner, one can counteract the development of a tendency to oscillation.

It is also within the ambit of the novel regulating method that, under operating conditions when a reduction of the input torque at the torque transmitting system is to be expected, such as for example during shifting from a higher gear into a lower gear or in response to hooking up additional aggregates, a potential short-lasting gripping of the friction clutch is counteracted by a reduction of the torque which is being transmitted by the friction clutch, such reduction of torque being achieved by reducing the torque division factor $k_c$ or the correction factor $k_{korr}$ by a predetermined value and by thereupon increasing the factor in accordance with a function in dependence on time to a value which is optional for the isolation of oscillations and for fuel economy.

Still another modification of the method proposes that the correction factor $k_{korr}$ compensate for departures of each special power train from an ideal condition by measuring the developing slip, preferably within a fixed quasi stationary operating range and with a time delay for exclusion of oscillations, by comparing the measured slip with a desired value of the slip such as ensures an optimal isolation of oscillations at maximum possible fuel economy, and by altering the factor $k_{korr}$ in the event of a difference between the desired slip and the actual slip.

An additional embodiment of the method provides that, in response to the transmission of a signal denoting the driver's or operator's desire for acceleration, preferably as evidenced by the velocity of change of the angle of the throttle valve, the slip in the torque transmitting system is increased by reducing the factor $k_c$ or the factor $k_{korr}$ so that the increase of the torque offered by the converter can be utilized as an additional reserve of torque.

Finally, another embodiment of the method provides that the slip in the torque transmitting system be determined by the friction clutch, preferably for all speed ratios so that the efficiency of the converter transmission output is pushed into the background to thus permit a design of the converter ensuring a maximum possible torque conversion range. Consequently, the available reserve of torque can be greatly increased by a selective increase of the slip in the torque transmitting system.

A further basic concept of the invention relates to a torque transmitting system for the power train of a vehicle which is equipped with a variable speed transmission, especially a motor vehicle wherein the prime mover is a combustion engine, a hydrodynamic power transmission or torque converter is connected to and is adapted to be driven by the prime mover of the vehicle and is operatively connected by an output shaft with an automatic transmission located in the power flow downstream of the torque converter, and a friction clutch is disposed in parallel with the hydrodynamic torque converter and is operable by a flowing pressurized fluid and having a first plenum chamber disposed between a turbine wheel of the converter and an annular piston which is operatively connected with a friction disc, and a second plenum chamber disposed between the annular piston and a converter cover. The plenum chambers are shaped in such a way that a pressure differential between them determines the magnitude of the torque which can be transmitted by the friction clutch. The torque transmitting system further comprises a measured value detecting system, a central computer unit and a hydraulic system which can cooperate with the computer unit to achieve a selective change of the pressure differential between the two plenum chambers and hence a change of the torque which can be transmitted by the friction clutch.

It is already known to provide torque transmitting systems wherein the torque which can be transmitted by a friction clutch connected in parallel with, and bypassing or bridging, a converter can be varied by selectively adjusting the pressure differential between the plenum chambers of the friction clutch.

Thus, the aforementioned published German patent application No. 31 30 871 already discloses a torque transmitting system of the above-outlined character wherein the slip developing between the input and the output is measured and compared with predetermined values of slip, and the thus detected differences, if any, are compensated for by appropriate regulation. This is accomplished in that one varies the difference between the pressures of flowable pressurized fluids in the two plenum chambers of a friction clutch which is connected in parallel with a hydrodynamic torque converter.

U.S. Pat. No. 5,029,087, already mentioned hereinbefore, also discloses a torque transmitting system with a torque converter and a friction clutch which is connected in parallel with the converter. The slip at the clutch is measured and is thereupon compared with predetermined values of slip. The pressure differential between the two plenum chambers of the friction clutch is altered in dependence upon the ascertained differences, if any, between the detected slip and the predetermined values of slip.

Finally, the U.S. Pat. No. 4,577,737 also discloses a torque transmitting system of the above-outlined character, namely a torque transmitting system wherein the transmission of torque by a hydrodynamic torque converter is directly measured by a torque sensor and the transmission of torque is determined in dependence upon the operating condition of the prime mover. The engagement of the friction clutch, which bridges or bypasses the converter is regulated in such a way that one achieves the desired transmission of torque.

A characteristic of the prior art torque transmitting systems is that the friction clutch which is installed in parallel with the torque converter is fully disengaged at the lower speed ratios and is engaged at the higher speed ratios. The utilized torque converters are "hard" in order to achieve a satisfactory overall efficiency and to limit the development of heat. In view of such a "hard" design of the torque converter, the rate of torque increase drops considerably in response to an increase of the RPM, with the result that only a very limited increase of torque or no increase at all takes place within the median RPM range.

Accordingly, an object of the present invention is to provide a torque transmitting system which constitutes an improvement in that, in order to ensure the establishment of acceleration reserves, one achieves an effective torque increase within the median as well as within the higher RPM range, and also that one achieves a reduction of fuel consumption.

In accordance with the invention, this object is accomplished in that the friction clutch is adjusted within each speed range and in that, when compared with conventional torque converters, the torque converter exhibits a higher conversion which preferably exceeds 2.5. It is particularly advantageous if the torque conversion between the turbine wheel and the pump wheel is within the range of between 2.5 and 3.5.

For a particular or selected combustion engine, it is of particular advantage if the torque converter which is utilized in connection with the present invention exhibits a smaller capacity factor or coefficient than the torque converters heretofore utilized in connection with such combustion engines. Thus, this means that when the progress of torque is determined by the combustion engine the fixed brake RPM of the torque converter which is employed in accordance with the present invention is higher than the same RPM of a conventional torque converter. The term "fixed brake RPM" is intended to denote that RPM at which the progress of the torque taken up by the turbine wheel crosses the characteristic RPM curve of the combustion engine. In order to ascertain such RPM, the turbine wheel is blocked and the pump wheel is driven by the combustion engine. In heretofore known designs of torque converters, the fixed brake RPM is within the range of between 1800 and 3000 revolutions per minute. In accordance with the present invention, such fixed brake RPM can be shifted into a range above 3000 revolutions per minute. The converter is softer if the capacity factor is lower. The above indicates that the progress of the turbine- and/or pump torque in relation to the turbine- and/or pump RPM is flatter than in heretofore utilized converters.

Thus, the converter which is used for the practice of the invention is "soft" and it can exhibit a much wider secondary characteristic curve or field.

This renders it possible to establish larger acceleration reserves or surpluses which are desirable primarily during overtaking or acceleration stages and, in addition, such a converter renders it possible to frequently avoid the need to shift into a lower gear.

The additionally usable or useful range of the secondary characteristic field of a torque converter which is designed in accordance with the invention is put to use primarily under unstable or non-stationary circumstances. The quantity of heat which develops during such stage is not greater than in heretofore known systems and, accordingly, is not critical. In accordance with a further development of the invention, it has been found to be of advantage if the computer unit of the torque transmitting system rounds upwardly the quantity of heat which develops when the vehicle is in use and compares the thus obtained actual heat balance with the maximum permissible quantity of heat for the particular design of the torque transmitting system. In addition, one monitors the temperature of oil so that the above-outlined computations and comparisons can proceed from an actual temperature level.

The afore-described undertaking permits timely detection of the development of inordinately large amounts of heat, which is a prerequisite for a reduction of the development of heat. The slip is reduced if the thermal stress upon the entire system is excessive. The slip is reduced at the will of the operator when the stressing of the friction surface is excessive. If the operator wishes to accelerate and conversion is still available, the lock-up torque is reduced to thus increase the slip. Alternatively, the lock-up torque will be increased to thus reduce the slip.

A further important development of the invention provides that a damper unit which is operative between the turbine of the torque converter and the friction disc of the lock-up clutch be preferably designed for the partial load range during which a complete bypassing of the converter can take place. This permits a greatly improved damping of oscillations of rotary movement in comparison with conventional dampers which are designed for maximum load. The isolation of high frequency oscillations within the remaining range takes place by way of slip.

The above undertaking renders it possible to achieve a compact design of the torque converter whose efficiency is only of secondary importance in view of the above-explained regulation of the lock-up clutch.

Additional inventive undertakings are pointed out in the description of the drawings and in the drawings.

A further basic concept of the invention pertains, as already mentioned above, to a lock-up clutch for a hydrodynamic torque converter of the type having a pump wheel, a turbine wheel, a guide wheel and a converter cover which is centered relative to the rotational axis, non-rotatably connected to the pump wheel and surrounds the turbine wheel. In accordance with a further feature of the invention which can be practiced alone or in combination with at least one further feature underlying the present invention, the centrally disposed annular piston which is installed between the converter cover and the turbine wheel includes a radially outer portion which is provided with a conical friction surface. The radially inner portion of the annular piston can be provided with a sealing hub which is mounted on a complementary sealing hub non-rotatably connected to the turbine wheel. At least one ring-shaped damper element of a damper unit can be received circumferentially between a damper input part which is non-rotatably connected with the turbine wheel and a damper output part which is non-rotatably connected with the turbine wheel.

As already mentioned above, the damper unit can comprise rotationally elastic means having the shape of a ring and having a friction surface provided at that side of the annular piston which faces toward the cover of the torque converter and cooperates with a conically configurated complementary surface of the converter cover.

A lock-up clutch of the afore-described character with cones which diverge in a direction toward the side facing away from the turbine wheel has a particularly short axial length and permits for the provision of a resilient damper with large angles of rotation because the ring-shaped damper element can be disposed between the radially outer part of the turbine wheel and the clutch disc which is provided with a friction surface and forms part of the annular piston. This leads to an increase of the nip between the peripheral part of the turbine wheel and the clutch disc of the annular piston and thus to more satisfactory possibilities of mounting the damper unit.

However, it can be of advantage for certain applications if the cooperating friction surfaces of the annular piston and the converter cover constitute or resemble cones which diverge in a direction toward the turbine wheel. In this manner, one ensures an increase of forces which is typical of conical clutches and a particularly rigid design of the annular piston.

A structurally desirable embodiment renders it advisable to non-rotatably connect the damper output part, which supports the output side of the damper element, with the radially outer portion of the turbine wheel. A damper input part which is non-rotatably connected with the annular piston serves as a support at the input side.

The damper output part can preferably constitute a ring-shaped part which is welded to the turbine wheel and is provided with entraining fingers extending in a direction toward the friction disc of the annular piston.

On the other hand, the damper input part preferably comprises or constitutes one or more leaf springs which are non-rotatably connected with the annular piston and comprise arms projecting from that side of the clutch disc which faces toward the turbine wheel of the torque converter and surround the resilient elements of the damper, and entraining members projecting from an end face and providing a support in the circumferential direction.

The details of the novel regulating method in connection with its utilization in motor vehicles of the type having a prime mover which constitutes a combustion engine, a torque transmitting system which employs a hydrodynamic power transmission or torque converter and a lock-up clutch in parallel with the torque converter, as well as the advantages which can be achieved by resorting to the novel method in comparison with conventional regulating methods, will be described with reference to the drawings, together with a lock-up clutch which is shown merely by way of example.

BRIEF DESCRIPTION OF THE DRAWINGS

These are shown in.

DESCRIPTION OF THE PREFERRED EMBODIMENTS

Figure 1:
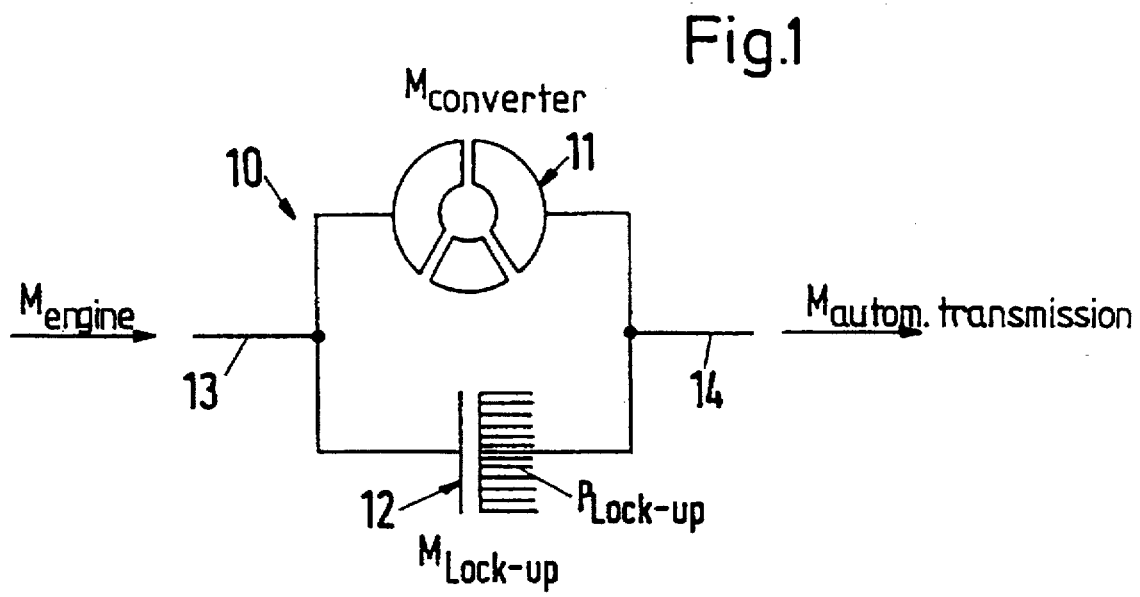
FIG. 1 a schematic representation of a torque transmitting system with a torque converter and a friction clutch which is connected in parallel with and bridges or bypasses the converter.
Figure 2:
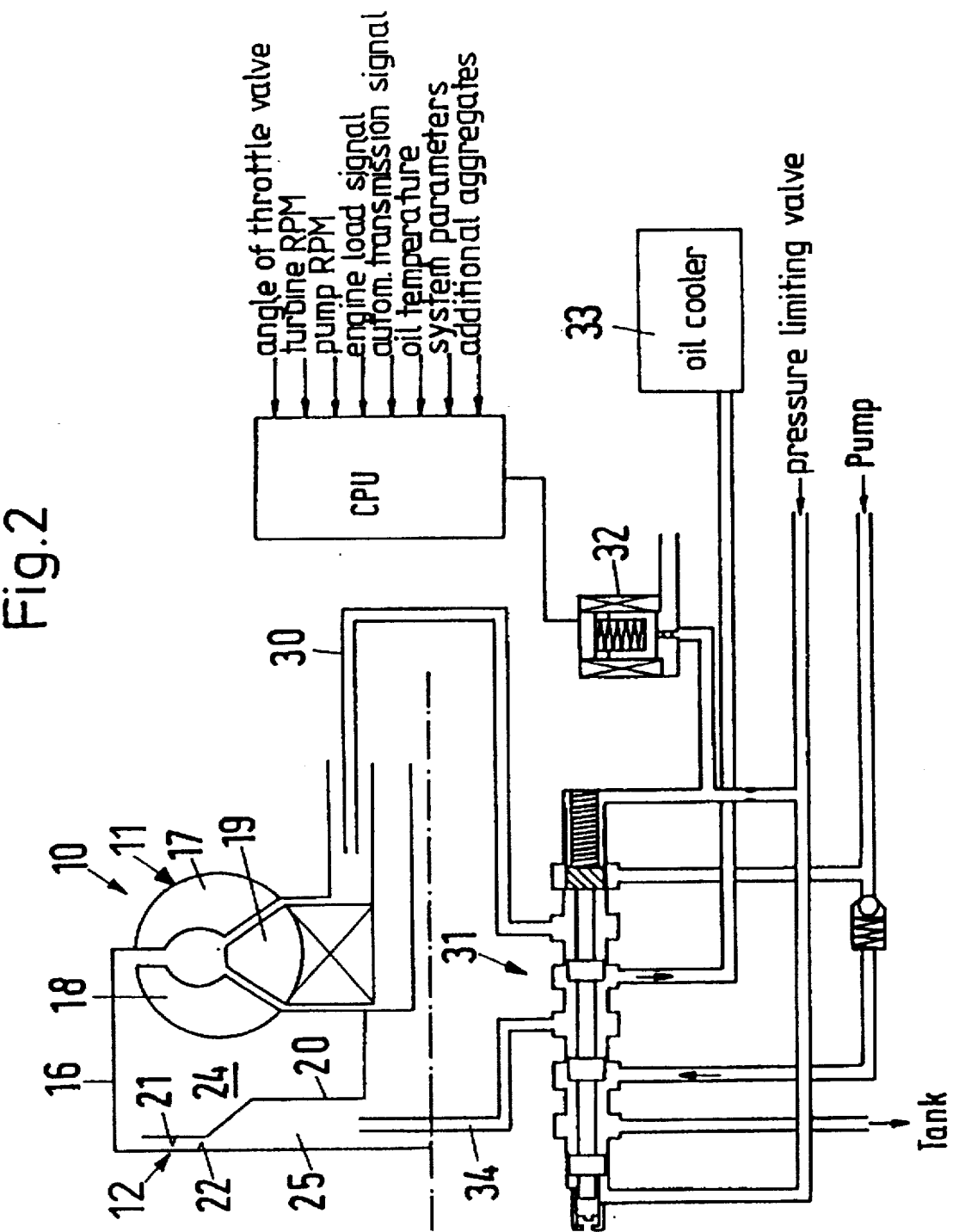
FIG. 2 a semi-sectional view of the torque transmitting system which corresponds to that shown schematically in FIG. 1 and which comprises a torque converter and a lock-up clutch, and further showing a diagram of the associated controls employing a pressurized fluid, FIG. 3 a diagram showing the division of engine torque into a torque which is to be transmitted by the torque converter and a torque to be transmitted by the lock-up clutch in dependence upon the slip which develops in the converter and in the friction clutch bridging the converter, FIG. 4 a graph of the engine RPM and the difference RPM at the converter as a function of time during acceleration of a vehicle with a gear shifting step in a converter bridging arrangement according to the invention, FIG. 5 a graph in correspondence with FIG. 4 of the output torque as a function of time during acceleration of a vehicle with a shifting operation and torque-regulated converter bypassing, FIG. 6 a graph in a view similar to that of FIG. 4 of the changes of RPM during acceleration and at slip-regulated converter bypass, FIG. 7 a graph in correspondence with FIG. 6 and in a view similar to that of FIG. 5 of the output torque as a function of time during acceleration and at slip-regulated converter bypass, FIG. 8 a graph in a view akin to those in FIGS. 4 and 6 of the changes of RPM during acceleration with a converter bypass which is disengaged in the course of a shifting operation to close again upon completion of the shifting operation, FIG. 9 a graph in correspondence with FIG. 8 of a view such as those in FIGS. 5 and 6 of the output torque as a function of time during acceleration while the converter bypass is open in the course of a gear shifting operation but is closed again upon completion of gear shifting, FIG. 10 a diagram showing the progress of the pressure differential which is effective at the lock-up clutch as a function of time and permits advance determination of that value of the pressure differential which is desired after elapse of a time interval, FIGS. 11 and 11b two embodiments of a torque transmitting system with a friction clutch which bypasses a hydrodynamic torque converter, FIG. 12 a diagram showing the division of engine torque into a torque which is transmitted by the torque converter and a torque which is transmitted by the lock-up clutch in dependence on slip at the converter and at the friction clutch which bypasses the torque converter, FIG. 13 a graph of the pump torque as a function of the pump RPM, with the RPM ratio turbine/pump as a parameter, in a primary characteristic field of a "hard" torque converter, FIG. 14 a graph of the turbine torque in a secondary characteristic field of a "hard" torque converter, FIG. 15 a graph of the output characteristic field of a conventional "hard" torque converter, FIG. 16 a graph of a view similar to that of FIG. 15 and showing the primary characteristic field of a "soft" torque converter with the pump torque as a function of the pump RPM and the RPM ratio turbine/pump as a parameter, FIG. 17 a graph of the turbine torque as a function of the turbine RPM in the secondary characteristic field of a "soft" torque converter as shown in FIG. 18, FIG. 18 a graph of the additionally available conversion range in a "soft" torque converter with superimposed secondary characteristic fields according to FIGS. 16 and 19, and FIG. 19 a graph of a view similar to that of FIG. 17 and showing the output characteristic field of a "soft" torque converter according to FIG. 18.

The torque transmitting system 10 shown in FIGS. 1 and 2 comprises a torque converter 11 and a lock-up clutch 12 which is operable by a flowing pressurized fluid and is connected in parallel with the torque converter. The torque transmitting system is operatively connected with a combustion engine, not shown, by a schematically indicated shaft 13 and its output is connected, by an output shaft 14, with an automatic transmission (not shown) which is installed in the output power train downstream of the system 10.

As shown in the semi-sectional view of the torque transmitting system 10 of FIG. 2 in combination with the fluid pressure regulating system, the torque converter 11 is a conventional hydrodynamic power transmission. This torque converter comprises a converter cover 16 which is connected with the output of the combustion engine, a pump wheel 17 which, together with the converter cover, constitutes the housing of the torque converter, a turbine wheel 18 which is connected with the non-illustrated automatic transmission by way of an output shaft, and a guide wheel 19 which is installed between the pump wheel and the turbine wheel. The friction clutch 12 bridges the converter and is disposed between the turbine wheel 18 and the converter cover 16 and comprises a clutch disc 20 which is non-rotatably connected with the turbine wheel 18 of the torque converter 11. The friction lining 21 of the clutch disc 20 cooperates with a complementary surface 22 of the converter cover 16. The friction clutch further comprises a rear chamber 24 which faces the turbine wheel 18 and a front chamber 25 which faces the converter cover 16.

In a manner known per se, the converter 11 receives a flowing pressurized fluid from a source (not shown) of pressurized fluid by way of a conduit 30 which discharges into the converter housing at the pump wheel. The fluid pressure is regulated by a regulating valve 32 which, in turn, is controlled by a control element. The fluid is evacuated by way of a conduit (not shown) which discharges into a schematically indicated cooler 33. In addition to acting upon the turbine wheel 18, the pressure of the pressurized fluid at the output side of the pump wheel 17 also prevails in the rear chamber 24 of the friction clutch 12 to act upon the clutch disc 20 in order to urge the latter against the complementary surface 22 forming part of the converter cover 16 and cooperating with the friction lining 21 of the clutch disc. Since the invention provides that the clutch 12 be operated with slip within the entire operating range, the clearance which is established between the friction lining 21 and the surface 22, and whose width is a function of the magnitude of slip, permits a throttled application of pressure by the flowing fluid in the front chamber 25 which is disposed between the clutch disc 20 and the converter cover 16. The pressure of fluid in the front chamber 25 is regulatable by a valve 31 which is installed in a conduit 34 communicating with the chamber 25, and the regulation is such that the pressure differential which exists between the rear chamber 24 and the front chamber 25 is regulatable to determine the magnitude of torque adapted to be transmitted by the friction clutch 12.

In view of the fact that the torque converter 11 and the friction clutch 12, which bridges or bypasses the converter, are connected in parallel, the engine torque equals the sum of torques which are being transmitted by the converter and the clutch, i.e., the transmitted torque equals the transmission torque which, if one disregards the losses in the torque transmission system, can be defined by the equation $$M_{engine} = M_{clutch} + M_{converter} = M_{transmission}.$$

Figure 3:
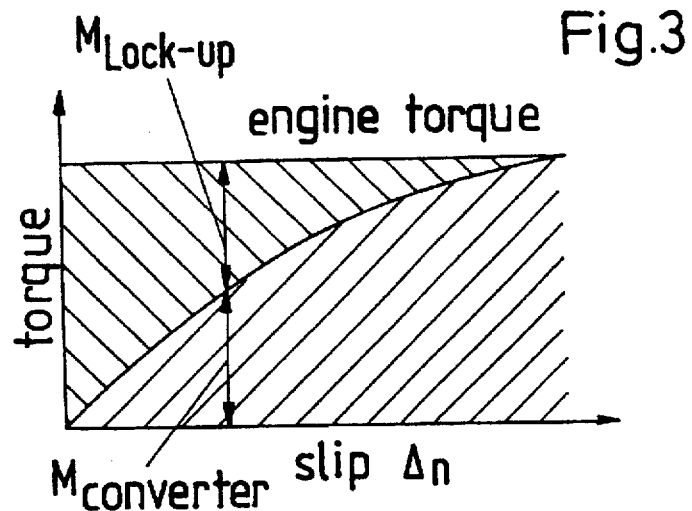

The division of engine torque into a first torque to be transmitted by the torque converter 11 and a second torque to be transmitted by the friction clutch 12 with latter bypasses the converter is shown in FIG. 3 as a function of slip. As can be seen, that portion of torque which is being transmitted by the converter 11 increases in response to increasing slip and, accordingly, the magnitude of torque being transmitted by the clutch 12 decreases.

However, the novel regulating method does not involve a regulation of slip but rather involves a determination of that portion of engine torque which is to be transmitted by the friction clutch 12 in dependence upon the operating condition of the engine and the selection of the required pressure differential at the friction clutch 12 so that the latter can transmit a predetermined torque. The selection is made by a computer unit, such as a microprocessor CPU shown in FIG. 2. The corresponding slip then develops in a fully automatic way.

Figure 4:
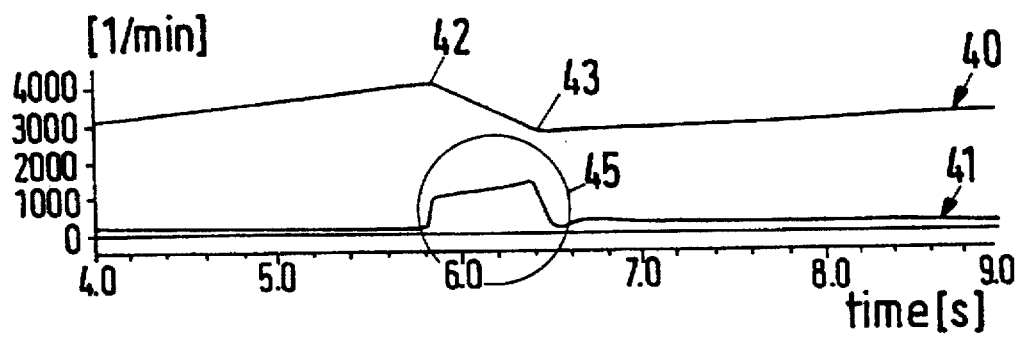

FIG. 4 shows the engine RPM 40 and the RPM differential 41 at the torque converter during acceleration and during shifting, for example, from the second into the third gear. In view of the acceleration, the engine RPM at first increases in the second gear until the gear shifting operation actually begins and thereupon decreases in the course of the gear shifting operation which begins at 42. On the other hand, the RPM differential at the converter 11 remains constant during an initial time period to thereupon rise considerably at 45 in the course of the gear shifting operation. Upon completion of the gear shifting operation from the second into the third gear ratio, the engine RPM and the converter RPM decrease as indicated at 43. The converter RPM decreases following a relatively small increase to a level above the constant level prior to the gear shifting operation. This can be seen in FIG. 4. On the other hand, the engine RPM increases slightly in view of the assumed acceleration in response to shifting into the third gear. It can be seen that the lock-up clutch 12, which bridges or bypasses the torque converter 11, does not grip or stick at any time. In other words, a slip exists during each stage of operation.

Figure 5:
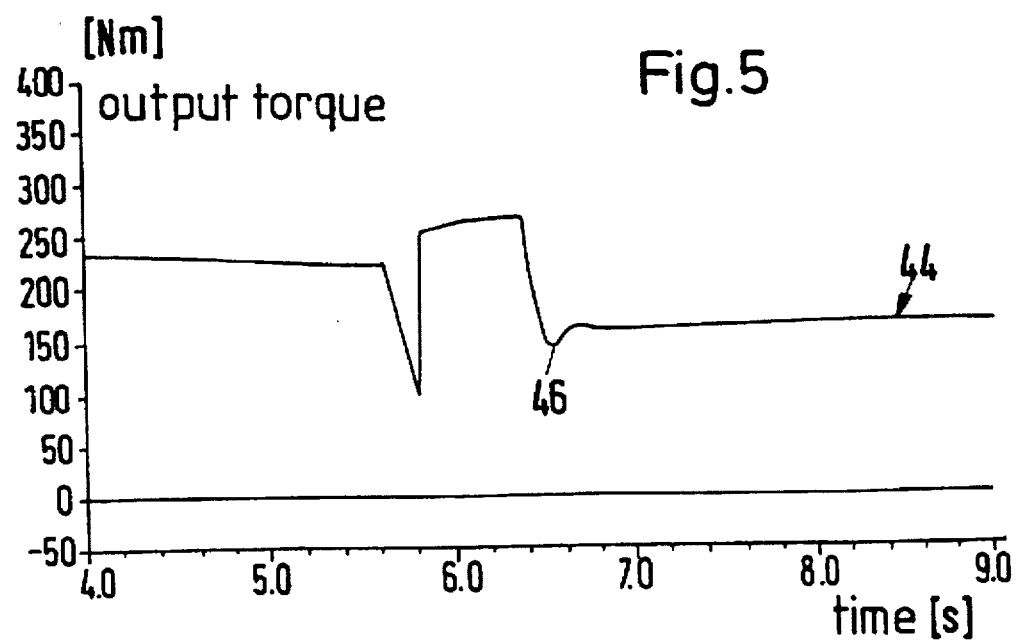

The output torque 44, which is shown in FIG. 5 as a function of time in correspondence with FIG. 4, is of particular interest. Such output torque decreases considerably during the initial stage of the gear shifting operation to thereupon undergo a steep increase during the stage of pronounced slip in view of the resulting increase of torque, and to decrease to a value corresponding to the third gear ratio without any substantial, and actually decreasing reverberation 46 in the power train.

FIGS. 6 and 7 illustrate that, when the torque converter is bypassed by resorting to the regulation of slip, the circumstances during shifting into different gears are basically different. The FIGS. 6 and 7 also show the conditions during shifting from the second speed ratio into the third speed ratio of a vehicle which is to be accelerated.

As can be seen in FIG. 6, the engine RPM 40' increases in the second gear until the actual gear shifting operation begins at 42'. At the same time, the RPM differential 41' at the torque converter, and hence the developing slip, remains constant. During the initial stage of gear shifting operation, as shown at 42', the engine RPM decreases while the RPM differential at the torque converter rises. When the gear shifting operation into third gear is completed, the engine RPM and the RPM differential at the converter decrease.

The tendency in the course of slip-regulated bridging of the torque converter is to maintain the RPM differential constant also in the course of a gear shifting operation; therefore, the gear shifting operation takes longer than in the case of torque-regulated bridging of the torque converter because the turbine of the converter cannot yield. When the gear shifting operation is completed, the bypassing friction clutch grips at 47 because the regulation of slip can become effective only when a difference has developed, and even then only at a velocity which is limited by the adjusting elements and the stability of the regulator. Finally, and as shown in FIG. 6, the relatively long-lasting shifting operation is followed by the development of slip 41' at a level similar to that prior to the gear shifting operation.

When the bypassing of the converter is regulated by regulating the slip, the output torque 44' (FIG. 7) also decreases abruptly at the start of the gear shifting operation to thereupon rise steeply in the same way as in the case of a torque-regulated converter and ultimately recedes upon completion of the gear shifting operation to a value corresponding to the third gear, with noticeable gradually decreasing reverberations 46.

It will be seen that the RPM gradient and the RPM difference are very large in the case of slip-regulated bypassing of the converter. This is the reason that, when the gear shifting operation is completed, the friction clutch grips and, in view of the fact that at such time the converter is totally bypassed, there develop the aforementioned secondary vibrations or reverberations in the output power train.

Analogously to FIGS. 4 and 5, FIGS. 8 and 9 also show the acceleration of a vehicle with gear shifting, the converter bypass being open in the course of the gear shifting operation and being closed upon completed shifting into a higher gear.

FIG. 8 shows that, until the start of a gear shifting operation at 42", the engine RPM 40" rises, whereas the RPM differential 41" at the converter decreases gradually. In the course of the actual gear shifting operation, the engine RPM decreases in accordance with the shifting into a higher ratio. The RPM differential 41" at the converter increases at the start of the gear shifting operation to thereupon decrease upon completion of gear shifting and to decrease to zero at 48 after the elapse of a predetermined time interval, due to the closing of the converter bypass. As concerns the output torque, at the start the conditions are quite similar to those in the course of the novel torque regulation of the converter bypass; however, the rapidly dying out reverberations 46" (see 44" in FIG. 9) immediately at the end of the gear shifting operation are followed by pronounced shifting shocks with only gradually decreasing reverberations 49 when the reference RPM drops to zero, i.e., in response to complete engagement or closing of the friction clutch which bypasses the converter.

As can be seen by comparing the novel regulating concept as shown in FIGS. 4 and 5 with the slip-regulated bypassing of the converter according to FIGS. 6 and 7 and the regulating concept with the converter bypass which is open in the course of a gear shifting operation and is closed when the gear shifting operation is completed as shown in FIGS. 8 and 9, the torque-regulated converter bypassing in accordance with the invention results in the development of greatly reduced shifting shocks than in accordance with conventional regulating proposals. This is due to the fact that, during shifting, the converter bypass which already operates with a predetermined slip is free to yield to thus ensure that the RPM differential can rise accordingly.

Figure 10:
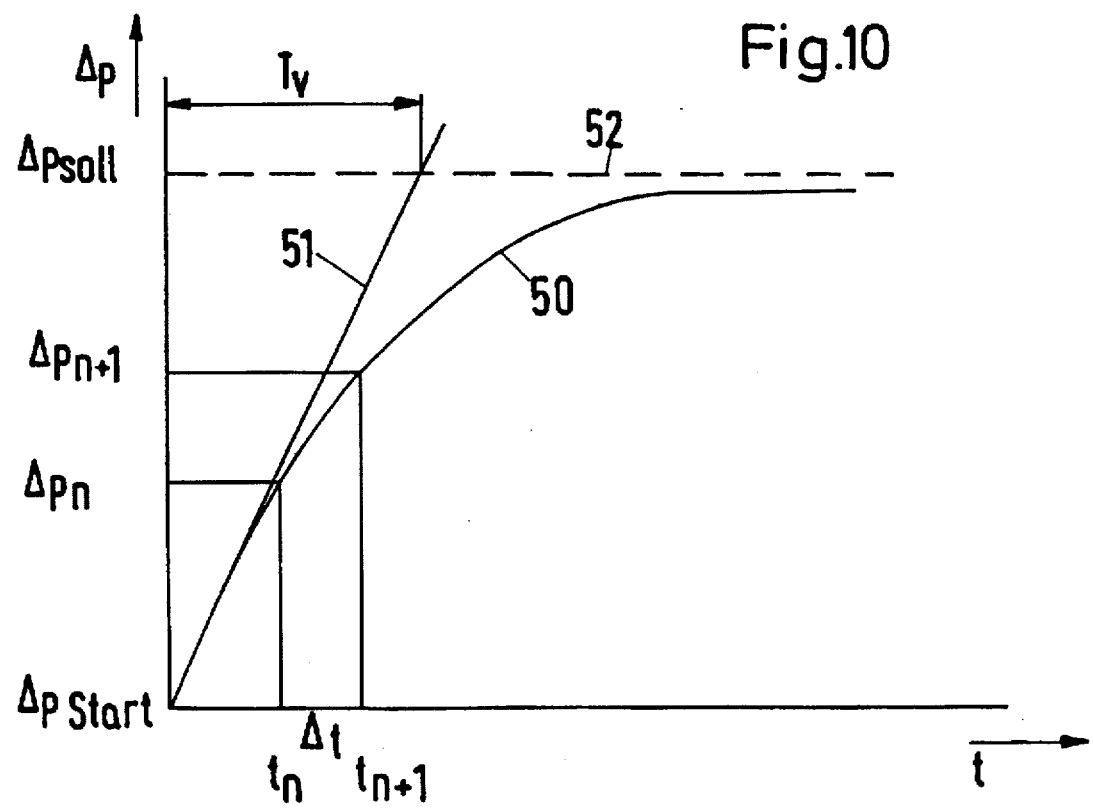

The curve 50 in the diagram of FIG. 10 represents the progress of the pressure differential ΔP at the lock-up clutch as a function of time. Starting from the initial pressure differential $\Delta P_{Start}$, the pressure differential initially undergoes a steep increase with time, as indicated by the tangent 51 at $\Delta P_{Start}$ and the rise thereupon gradually decreases to ultimately asymptotically approach the desired pressure differential which is indicated by the dash line 52. This is carried out by stepwise approximation in that, by relying upon the equation (see claim 28) and starting with a pressure differential $\Delta p_n$ at the time interval $t_n$, the pressure differential $\Delta p_{n+1}$ after the elapse of the interval $t_{n+1}$ is determined, the pressure differential gradient which is required after the time interval Δt is calculated and such gradient is set with assistance from the hydraulic system. The same series of steps is thereupon repeated again and again until the pressure differential reaches the desired value which is indicated by the dash line 52.

Figure 11A:
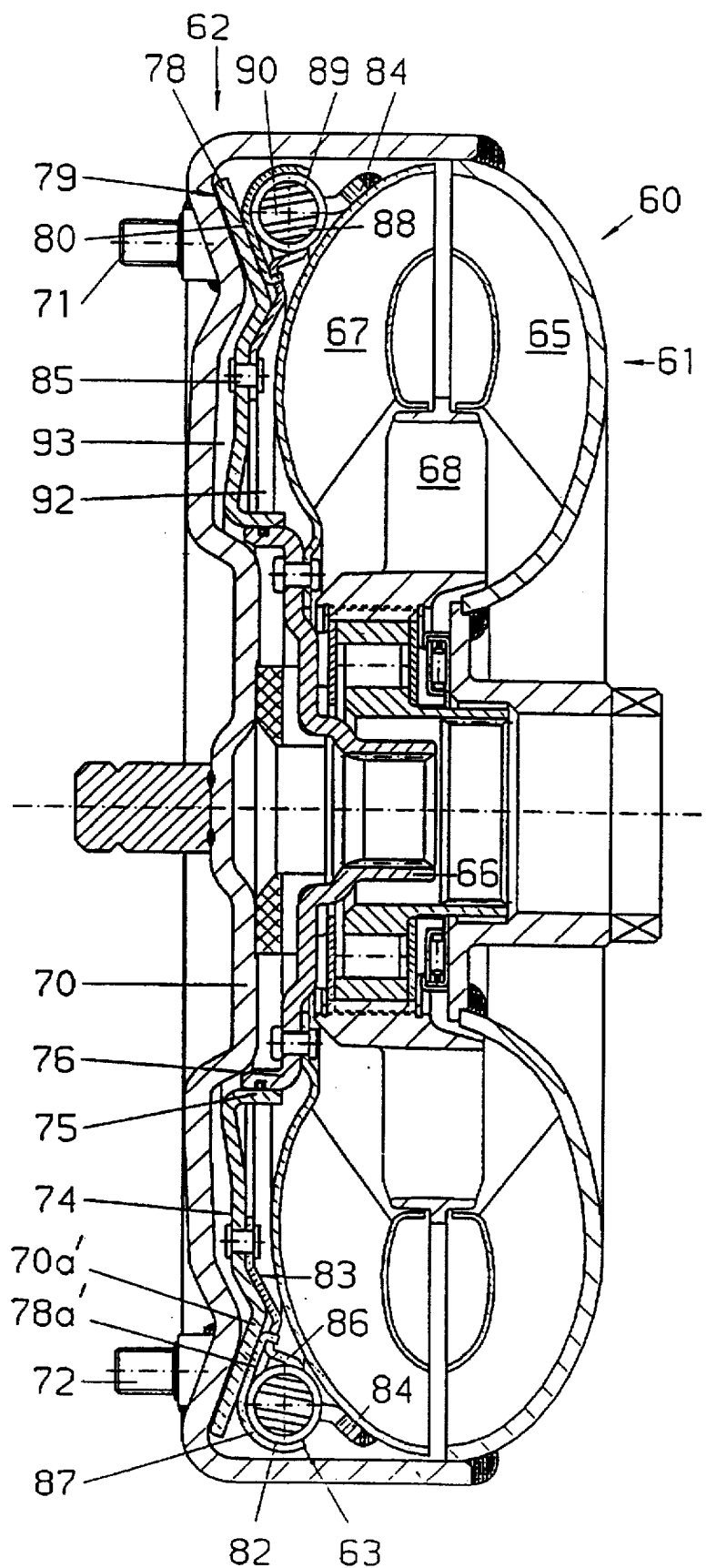
Figure 11B:
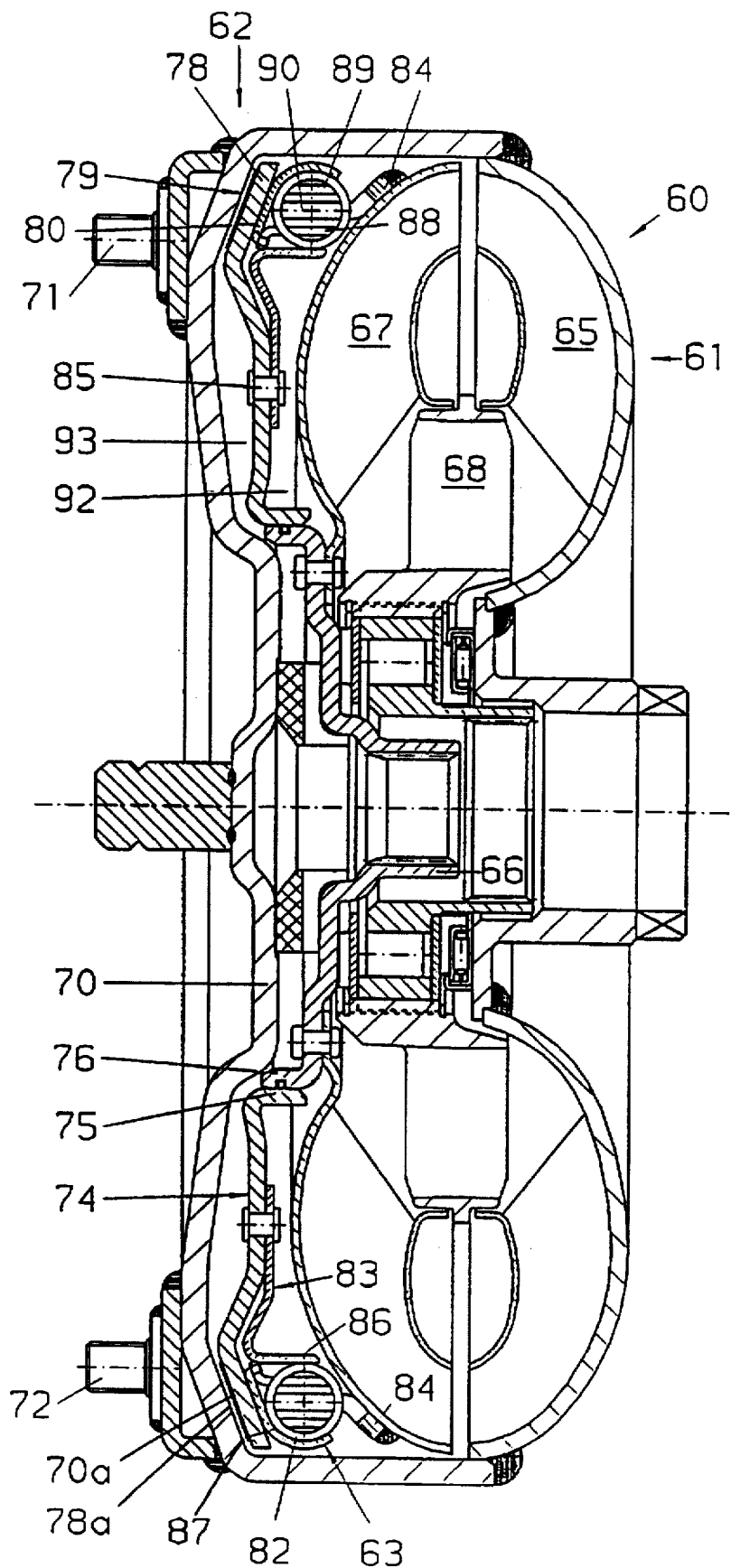

These embodiments of the torque transmitting system 60 which are illustrated in FIGS. 11a and 11b each comprise a hydrodynamic torque converter or torque transmission 61 with a lock-up clutch 62 and a damper unit 63 which operates between the torque converter and the lock-up clutch.

The torque converter 61 comprises a pump wheel 65 which is non-rotatably connected with and is driven by a combustion engine, not shown, a turbine wheel 67 which is non-rotatably connected with an output hub 66, a fixed guide wheel 68 which is installed in the path of fluid flow between the pump wheel 65 and the turbine wheel 67, and a converter cover 70 which is non-rotatably connected with the pump wheel and surrounds the turbine wheel.

The converter cover 70 extends the driving connection between the combustion engine and the pump wheel 65 to entraining or motion transmitting pins 71, 72 projecting beyond that side of the cover which faces away from the pump wheel and carrying a non-illustrated flywheel of the combustion engine.

An annular piston 74, whose axis of rotation coincides with the rotational axis of the torque converter 61 is disposed between the turbine wheel 67 and the converter cover 70.

The illustrated annular piston 74 is a shaped piece of sheet metal and its radially inner portion is provided with a sealing hub 75 surrounding a complementary sealing hub 76 projecting from the hub member 66 which latter is non-rotatably connected with the turbine wheel 67. The radially outer portion of the annular piston 74 constitutes a clutch friction disc 78 having a conical friction surface 79.

The conical friction surface 79 of the friction disc 78 forming part of the annular piston 74 cooperates with a correspondingly configurated conical complementary friction surface 80 on the converter cover 70 which latter is non-rotatably connected with the pump wheel 65. The cones of the cooperating friction surfaces 79, 80 diverge toward that side of the piston 74 which faces away from the turbine wheel 67 as indicated by the widely spaced apart hatching lines. In view of such configuration, the peripheral region of the turbine wheel 67 and the conically configurated clutch disc 78 of the annular piston 74 define an annular clearance or nip the radially outer portion of which is surrounded by the converter cover 70.

The annular clearance receives ring-shaped resilient damper elements 82. As seen in the circumferential direction, one side of each damper element 82 abuts one of damper input members 83 which are non-rotatably connected with the annular piston 74 by rivets 85, and the other end of each damper element 82 abuts one of a plurality of damper output members 84 which are non-rotatably secured to the turbine wheel 67.

The damper input members 83 constitute or resemble leaf springs and are disposed at that side of the annular piston 74 which faces toward the turbine wheel 67. These input members are non-rotatably connected with the annular piston 74 in the region between the sealing hub 75 of the annular piston and the clutch friction disc 78. The damper input members 83 follow the outline of the annular piston 74 and are provided with projecting arms 86, 87 which surround the resilient damper elements 82 as well as with entraining members 88, 89 each of which engages an end face of one of the resilient damper elements.

The damper output members 84 are ring segments which are welded to the peripheral portion of the turbine wheel 67 and have entraining fingers 90 which extend from the respective ring segments in a direction toward the clutch friction disc 78 of the annular piston 74. The entraining fingers 90 engage the other ends of the resilient damper elements 82. Thus, the resilient elements 82 are received between the entraining members 88, 89 of the damper input members 83 and the projecting entraining fingers 90 of the damper output members 84.

Figure 15:
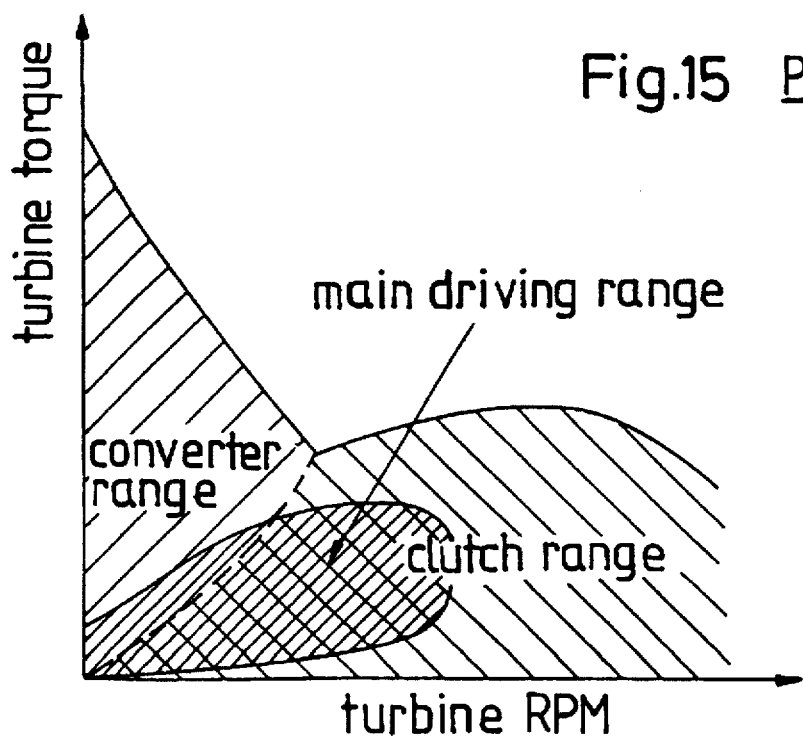
Figure 19:
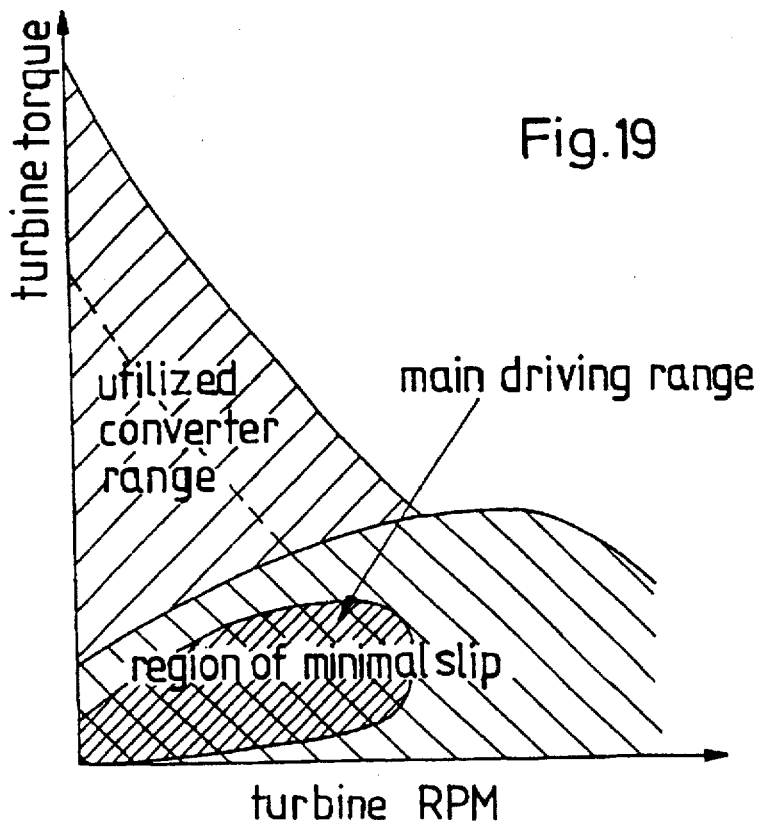

The damper unit 63 of the converter 61 is preferably designed for the main driving range which is indicated in FIGS. 15 and 19 by hatched areas. In view of the fact that a complete bypassing of the converter 61 is required only within this main driving range, such design of the damper unit 63 ensures the establishment of a much more satisfactory damping of angular oscillations than that which is possible if the damper unit were designed to be effective within a much wider operating range. Furthermore, this renders it possible to enhance the compactness of the converter 61.

Each lock-up clutch 62 comprises a front plenum chamber 92 between the annular piston 74 and the turbine wheel 67, and a rear plenum chamber 93 between the annular piston and the converter cover 70. The clutch friction disc 78 is actuatable to advance toward its clutching position of engagement with the complementary friction surface of the converter cover 70 in response to increasing pressure of hydraulic fluid in the front plenum chamber 92, and the selection of the torque to be transmitted by the friction clutch 62 takes place in dependence upon the pressure differential between the front plenum chamber 92 and the rear plenum chamber 93.

The input torque which is transmitted by the non-illustrated flywheel (such flywheel is non-rotatably connected with the converter cover 70 by the entraining pins 71, 72 projecting from that side of the converter cover 70 which faces away from the torque converter 61) is applied directly to the pump wheel 65 when the lock-up clutch 62 is open or disengaged, to be thereupon transmitted to the output hub 66 by the turbine wheel 67 in view of the thus developing flow of the hydraulic fluid medium.

However, when the lock-up clutch 62 is fully engaged or closed so that the friction disc 78 of the annular piston 74 cooperates with the complementary friction surface 80 of the converter cover 70 without any slip, the resilient damper elements 82 effect a direct mechanical transmission to the turbine wheel 67 of that input torque which is being applied at the converter cover. The input hub or driving hub 66, which is fixedly connected to the turbine wheel 67, transmits the torque to an output power train which is driven by the automatic transmission. The latter receives torque from the hub 66.

Figure 12:
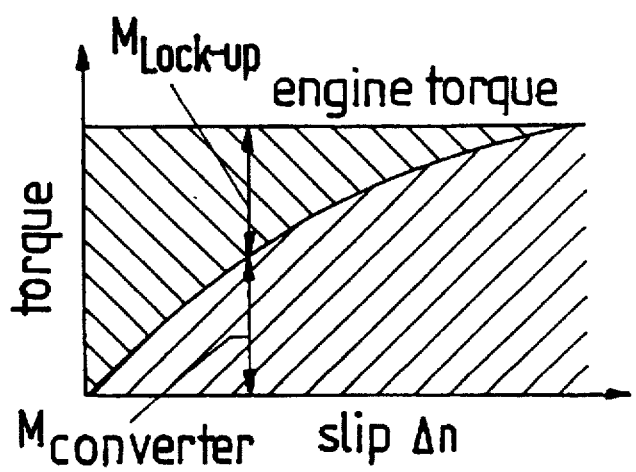

When the lock-up clutch 62 operates with slip as a result of a pressure differential between the front plenum chamber 92 and the rear plenum chamber 93, the input torque which is being transmitted by the converter cover 70 is divided as a function of slip into a torque which is being transmitted by the lock-up clutch 62 on the one hand and into torque which is being transmitted by the torque converter 61 on the other hand. This is shown schematically in FIG. 12.

The transmission of torque from the lock-up clutch 62 to the turbine wheel 67 and to the output hub 66 which is non-rotatably connected with the turbine wheel ensures an effective balancing of irregularities of the input torque. Due to the fact that the resilient damper elements 82 are disposed in the peripheral region between the friction disc 78 of the annular piston 74 and the turbine wheel 67, it is now possible to adequately control relatively large spring travels.

In accordance with the invention, the friction clutch 12 or 62 can be controlled in such a way that it remains at least partially engaged or closed at least temporarily in each forward speed of the automatic transmission. In other words, provision is made for a regulation of the slip of the clutch in the first speed or above the first speed setting of the automatic transmission. This also includes complete closing or engagement of the friction clutch.

As shown in FIG. 11b at 70a and 78a, an embodiment of the invention can provide that the conical friction surfaces of the converter cover 70 and of the friction disc 78 diverge radially outwardly toward the turbine wheel 67. This renders it possible to install the resilient damper elements closer to the axis of the torque converter, e.g., around the hub 66. FIG. 11 a shows a modification wherein the conical friction surfaces converge radially inwardly (at 70a' and 78a') toward the axis of the clutch 62.

In torque transmitting systems of conventional design, the lock-up clutch is fully open in the lowermost speed ratio of the automatic transmission and is operative in the higher speed ratios. The torque converters of such conventional systems are designed to be "hard" in order to achieve a satisfactory overall efficiency and to limit the amount of developing heat. FIG. 13 shows the primary characteristic field of a "hard" torque converter. The pump torque is represented as a function of the pump RPM and the parameter is constituted by the RPM ratio turbine/pump.

FIG. 13 further shows a characteristic field of a prime mover with the output torque of the prime mover shown as a function of the RPM of the prime mover; such RPM of the prime mover corresponds to the turbine RPM.

Furthermore, FIG. 13 also shows by hatching the main driving range which embraces the RPM range between approximately 750 and 2000 revolutions per minute.

Figure 14:
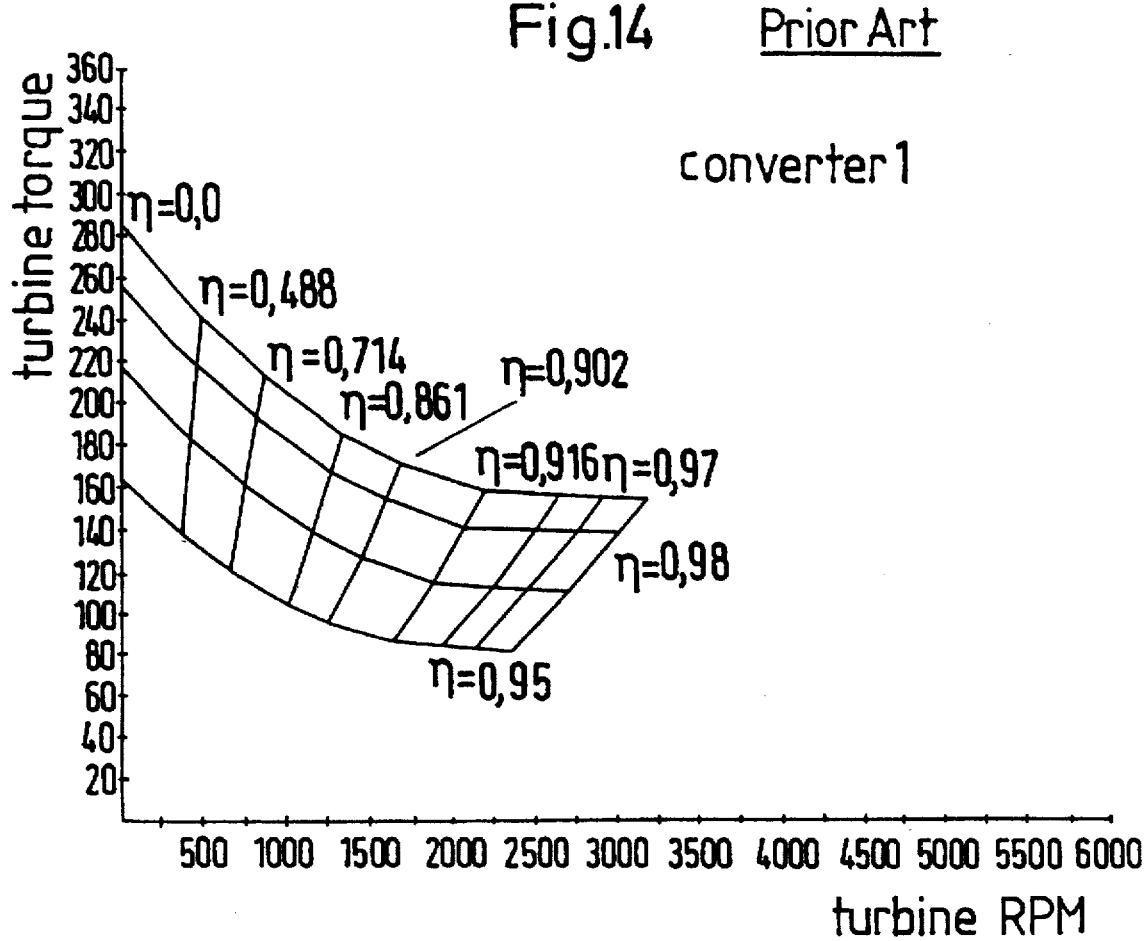

The secondary characteristic field which is shown in FIG. 14 is indicative of the turbine torque as a function of the turbine RPM. This Figure further shows the efficiency at different output ranges when utilizing a hard torque converter having a characteristic field of the type indicated in FIG. 15.

The characteristic output field which is shown in FIG. 15 wherein the turbine torque of the converter is shown as a function of the turbine RPM. Such characteristic field is indicative of that converter range in which the turbine torque decreases abruptly in response to increasing RPM. FIG. 15 shows the clutch region which is adjacent the converter region. Still further, the closely adjacent hatching lines indicate the main driving range which is entered into the characteristic output field.

The rise of torque decreases considerably in response to increasing RPM in conventional torque transmitting systems wherein the selected converter is a "hard" converter in order to limit the development of heat. Therefore, the increase of torque in the median RPM range is negligible and is reduced to zero within the higher RPM range.

Figure 16:
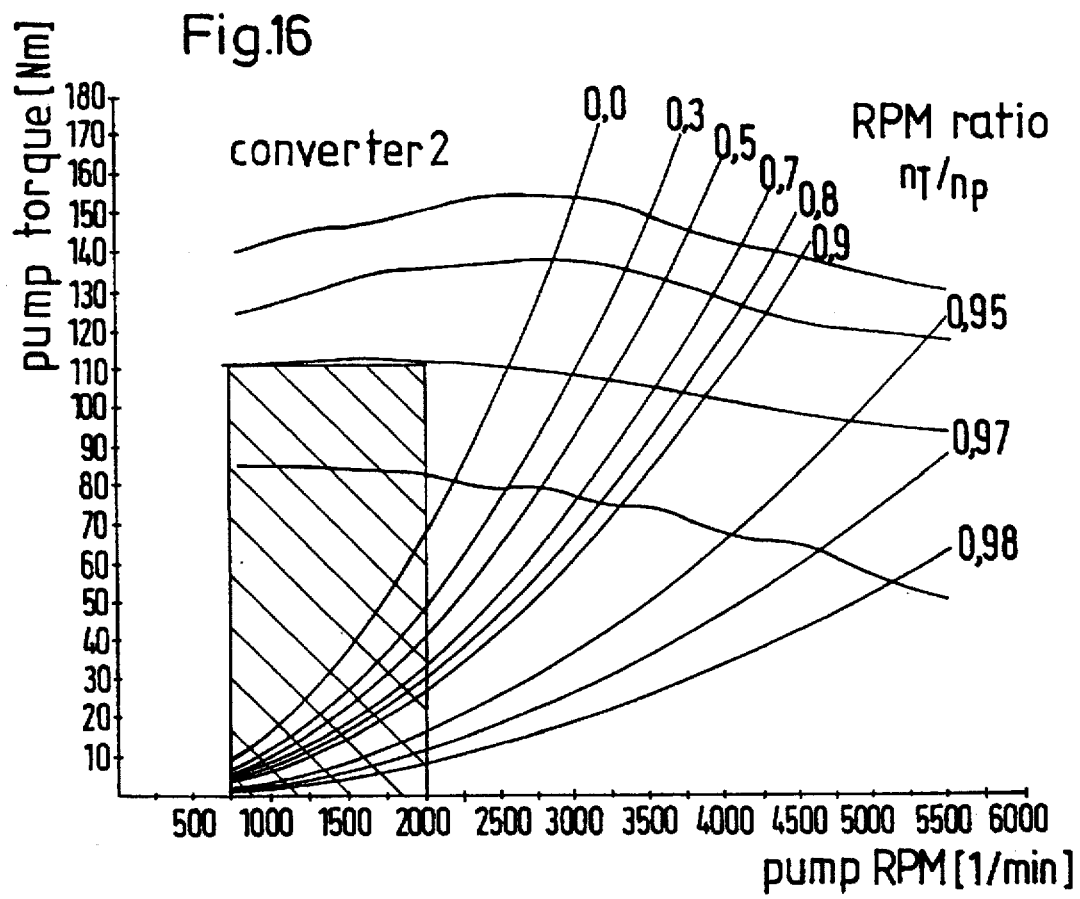

The primary characteristic field which is shown in FIG. 16 illustrates the pump torque as a function of the pump RPM and a parameter which is the turbine/pump RPM ratio of a "soft" torque converter. The characteristic curves of the "soft" converter exhibit a progress which is much flatter than that of the same parameters shown in FIG. 13. The converter range embraces the median RPM range up to the upper RPM range.

Figure 17:
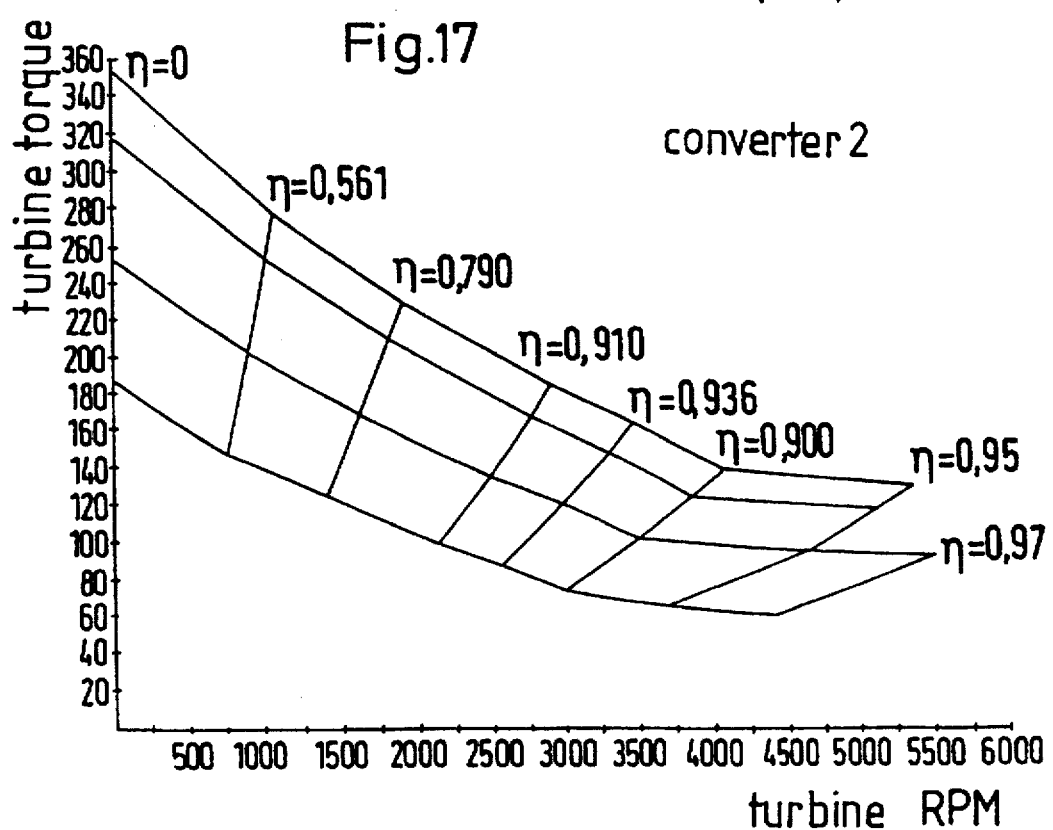

As shown in FIG. 17, this results in a much wider secondary field in comparison with the secondary field of a hard converter as shown in FIG. 14. Accordingly, when the torque converter is soft, greatly enlarged acceleration reserves are available so that, in many instances, the operator need not shift back during acceleration of the vehicle.

Figure 18:
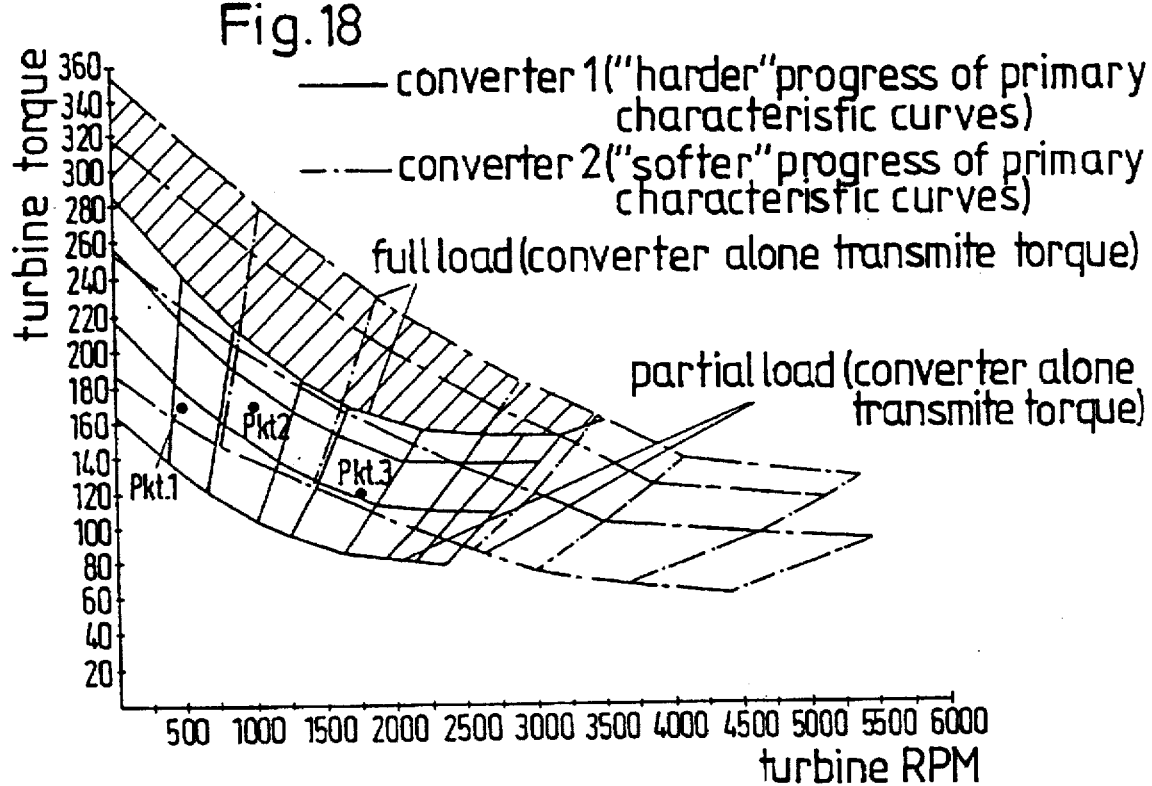

Such acceleration reserves are shown more particularly in FIG. 18 wherein the secondary field of a soft converter according to FIG. 14 overlies the secondary field of a hard converter according to FIG. 17. When the converter is soft, one gains the hatched region between the full-load curves of the two torque converters for the transmission of torque.

This is also shown in the characteristic output field of FIG. 19 of a torque transmitting system employing a soft converter according to FIG. 15. The useful or utilized converter range is increased, in comparison with the characteristic output field of FIG. 15, by a region which is indicated in the upper part of FIG. 19. FIG. 19 further shows, by closely adjacent hatching lines, the main driving range and the region of minimum slip.

FIG. 18 further shows the operating points indicated at Pkt. 1, 2 and 3. The following slip values and degrees of efficiency can be determined at the aforementioned operating points in connection with "hard" and "soft" torque converters:

|        | "hard" converter |              | "soft" converter |              |
| ------ | ---------------- | ------------ | ---------------- | ------------ |
|        | slips (%)        | efficiency η | slips (%)        | efficiency η |
| Point 1| 65               | 0.547        | 75               | 0.388        |
| Point 2| 40               | 0.789        | 60               | 0.669        |
| Point 3| 2                | 0.980        | 2                | 0.980        |

It will be seen that, in the lower and median RPM ranges of a "soft" converter, the efficiency of such converter is less than that of a "hard" converter; however, the slip is much more pronounced and hence the transmission of torque is improved. On the other hand, at the operating point 3 of FIG. 18 the slip and the efficiency of the soft and hard torque converters are the same.

In view of the dynamic behavior of hydraulic and mechanical systems, an excessively rapid increase of the value of a parameter which influences the division of the torque to be transmitted by the torque transmitting system between the torque converter and the friction clutch can result in the generation of oscillations having varying frequencies due to excessive shock or due to blocking or clinging of the friction clutch.

In order to avoid such oscillation-causing excitations, a further desirable embodiment of the invention provides that the selection of a newly computed value of a parameter which influences the division of the torque to be transmitted between the converter and the friction clutch and which departs from a previous value, preferably of the pressure differential, take place in accordance with a function in dependence on time.

The selection of a newly computed value which departs from the previous value of a parameter serving to determine the division of the torque to be transmitted between the converter and the friction clutch can be delayed also in accordance with a function in dependence upon the RPM differential between the input and the output of the torque transmitting system.

It is further possible to select the value of a parameter which influences the division of the torque to be transmitted between the converter and the friction clutch and which departs from the previously utilized parameter by relying on a function determining the delay in accordance with a gradient of the RPM of the prime mover.

The invention is not limited to the illustrated and described embodiments but also embraces especially all those modifications which can be arrived at by combining the features and/or elements which were described in connection with the present invention. Furthermore, the individual features and modes of operations which were described in connection with the drawings can constitute independent inventions per se.

The applicant reserves the right to claim additional features which rise to the level of an invention and were merely disclosed in the specification, particularly in conjunction with the Figures of the drawings. Thus, the patent claims which are being filed in the present application merely constitute proposals to formulate the invention without prejudicing applicant's rights to acquire broader patent protection.

What is claimed is:

1. A method of regulating a torque transmitting system which forms part of a power train, said power train having an operating range and said torque transmitting system (a) being operatively connected with a torque transmitting output of a prime mover, (b) being drivingly connected with an automatic transmission by an output shaft, and (c) comprising a hydrodynamic power transmission a friction clutch in parallel with the power transmission and a central computer unit, the application of a force to the friction clutch, and hence a torque which is being transmitted by the friction clutch, being designed to vary under the control of the central computer unit, said method comprising the steps of: ascertaining a torque which is to be transmitted by the friction clutch in dependence upon the torque being transmitted by the output of the prime mover, and computing, adaptively selecting and applying to the friction clutch that force which is required for the transmission of the ascertained clutch torque resulting in automatic development of a minimal slippage between an input and an output of said friction clutch and in long-range correction of departures from an ideal condition.

2. The method of claim 1, wherein said step of ascertaining is in accordance with the equation $$M_{clutch} = k_{mc} \cdot k_{korr} \cdot (M_{prime\ mover} + M_{korr\_MOT}) + M_{korr\_w\mathrm{U}}$$

wherein $M_{clutch}$ is torque at the friction clutch, $k_{mc}$ is a torque division factor, $k_{korr}$ is a correcting factor for compensation of multiplicatively developing errors, $M_{korr\_MOT}$ is a correction torque for compensation of errors developing in addition to the torque transmitted by the prime mover, and $M_{korr\_w\mathrm{U}}$ is a correct torque for compensation of errors developing in addition to the clutch torque, with attendant automatic development of minimal slippage between the input and the output of the torque transmitting system in dependence upon the magnitude of the torque division factor $k_{mc}$ which is constant within the entire operating range of the power train, and with attendant long-range correction of departures from an ideal condition with the correction factor $k_{korr}$ and correction torques $M_{korr\_MOT}$ and $M_{korr\_w\mathrm{U}}$.

3. The method of claim 2, wherein the torque division factor $k_{mc}$ is a value which is a function of the output RPM of one of the torque transmitting system and the prime mover.

4. The method of claim 2, wherein the torque division factor $k_{mc}$ is a value which is dependent solely upon the RPM of the prime mover.

5. The method of claim 2, wherein the torque division factor $k_{mc}$ is a value which is a function not only of the RPM but also of the torque of the prime mover.

6. The method according to claim 2, wherein the torque division factor $k_{mc}$ is a value which is a function not only of the output RPM of one of the torque transmitting system and the prime mover but also of the torque of the prime mover.

7. The method of claim 2, wherein a desired pressure differential at the friction clutch is selected by obtaining from a characteristic curve a signal which is proportional to pressure and denotes the flow of a fluid through a valve, and compensating for the developing differences between a desired and an actual pressure of the fluid by means of an I-feedback.

8. The method of claim 2, wherein the torque which is actually transmitted by the friction clutch tends to depart from a desired torque due to at least one of errors resulting from multiplication ($k_{korr} \neq 0$, $M_{korr\_MOT} = 0$, $M_{korr\_w\mathrm{U}} = 0$), errors developing additively to engine torque ($k_{korr} = 0$, $M_{korr\_MOT} \neq 0$, $M_{korr\_w\mathrm{U}} = 0$), errors developing additively to clutch torque ($k_{korr} \neq 0$, $M_{korr\_MOT} = 0$, $M_{korr\_w\mathrm{U}} \neq 0$), errors developing multiplicatively and additively to the engine torque ($k_{korr}\neq0$, $M_{korr\_MOT}\neq0$, $M_{korr\_wU}=0$), errors developing multiplicatively and additively to the clutch torque ($k_{korr}\neq0$, $M_{korr\_MOT}=0$, $M_{korr\_wU}=0$), and errors developing multiplicatively and additively to the engine torque as well as to the clutch torque ($k_{korr}\neq0$, $M_{korr\_MOT}\neq0$, $M_{korr\_wU}=0$), and wherein a compensation for such errors is carried out with a time constant of several seconds in order to achieve an acceptable adaptive character of the regulation of the torque transmitting system.

9. The method of claim 2, wherein the prime mover is an engine of a vehicle and, in response to transmission of a signal denoting the desire of a driver of the vehicle for acceleration, said slippage is increased by reducing the $k_{mc}$-factor so that a thus achieved increase of the torque adapted to be transmitted by the power transmission can be utilized as a reserve of torque.

10. The method of claim 2, wherein said transmission has a plurality of speed ratios and said slippage develops at all of said speed ratios, the efficiency of the transmission being secondary to a design of the transmission ensuring a high stall-speed RPM and a wide power transmission range.

11. The method of claim 1, wherein the friction clutch is actuatable by pressurized fluid and is constructed in such a way that two separate plenum chambers develop between the friction clutch and a cover of a housing of the power transmission on the one hand and between the friction clutch and the remaining part of said housing on the other hand, and further comprising the step of transmitting the ascertained torque by a pressure differential between the plenum chambers.

12. The method of claim 1, wherein the prime mover is a combustion engine and an operating condition of the system is determined in dependency upon at least one of an engine RPM and an angle of a throttle valve, the engine RPM and a fuel throughput, the engine RPM and a subatmospheric pressure in a suction manifold, and the engine RPM and a fuel injection time.

13. The method of claim 1, further comprising the step of repeatedly selecting, with a delay as a function of time, a freshly computed value of a parameter which influences a division of the torque to be transmitted into a torque to be transmitted by the power transmission and a torque to be transmitted by the friction clutch and which freshly computed value departs from a previously computed value and constitutes a pressure differential.

14. The method of claim 1, further comprising the step of repeatedly selecting, as a function of the difference between the RPMs at the input and at the output of of the torque transmitting system, a freshly computed value of a parameter which influences the division of the torque to be transmitted into a torque to be transmitted by the power transmission and a torque to be transmitted by the friction clutch and which which freshly computed value departs from a previously computed value and constitutes a pressure differential.

15. The method of claim 1, further comprising the step of repeatedly selecting, with a delay as a function of a gradient of the RPM of the prime mover, a freshly computed value of a parameter which influences the division of the torque to be transmitted into a torque to be transmitted by (between) the power transmission and a torque to be transmitted by the friction clutch and which freshly computed value departs from a previously computed value and constitutes a pressure differential.

16. The method of claim 1, wherein a pressure differential which is desired at the friction clutch is selected with assistance from one of a PI-regulator and a PID-regulator.

17. The method of claim 1, wherein a pressure differential which is desired at the friction clutch is selected in that a signal which is proportional to the desired pressure differential and is indicative of at least one of a flow ratio and a monitoring ratio, is computed with assistance from at least one of a PI-regulator, an I-regulator and a PID-regulator.

18. The method of claim 1, wherein the departures of the torque which is actually transmitted by the friction clutch from a desired torque are determined by the steps of measuring the slippage which develops between the input and the output of the torque transmitting system, and comparing the measured slippage with a set of desired values.

19. The method of claim 1, wherein the departures of the torque which is actually transmitted by the friction clutch from a desired torque are determined by the steps of ascertaining the torque which is being transmitted by the power transmission on the basis of a characteristic of the power transmission to thus monitor a division of torque between the power transmission and the friction clutch.

20. A method of regulating a torque transmitting system which forms part of a power train, said power train having an operating condition and said torque transmitting system (a) being operatively connected with the output of a prime mover, (b) being drivingly connected with an automatic transmission by an output shaft, and (c) comprising a hydrodynamic power transmission, a friction clutch in parallel with the power transmission and a central computer unit, a force adapted to be applied to and a torque adapted to be transmitted by the friction clutch being variable under the influence of the central computer unit, said method comprising the steps of determining the torque which is to be transmitted by the friction clutch in dependence upon the operating condition of the prime mover in accordance with the torque equation $M_{clutch}=k_c \cdot k_{korr} \cdot M_{prime\ mover}$, wherein $k_c=k_{mc}$ constituting a torque division factor and $k_{korr}$ is a correction factor, and computing, selecting and applying to the friction clutch that force which is required for the transmission of the predetermined clutch torque so that a slippage between an input and an output of the torque transmission system is automatically determined in dependence upon the torque division factor $k_c$, which is a constant within the operating range of the power train, and the correction factor $k_{korr}$ compensates for departures of the power train from an ideal condition.

21. The method of claim 20, wherein the friction clutch is actuatable by a flowing pressurized fluid and is constructed in such a way that two separate plenum chambers develop between the friction clutch and a cover of a housing of the power transmission on the one hand and between the friction clutch ansd the remaining part of said housing on the other hand, and further comprising the step of transmitting the determined torque by a pressure differential between the plenum chambers.

22. The method of claim 20, wherein the prime mover is a combustion engine and the operating condition of the torque transmitting system is determined in dependence upon the engine RPM and the angle of a throttle valve.

23. The method of claim 20, wherein the prime mover is a combustion engine and the operating condition of the torque transmitting system is determined in dependence upon the engine RPM and the subatmospheric pressure in a suction manifold.

24. The method of claim 20, wherein the prime mover is a combustion engine and the operating condition of the torque transmitting system is determined in dependence upon the engine RPM and a fuel injection time.

25. The method of claim 20, wherein the torque which is to be transmitted by the friction clutch, which has been determined by the central computer unit in dependence upon a change of torque in the power train, and which departs from a momentary torque, is selected by resorting to the following steps: determining in advance the value of a selected parameter X which is desired after elapse of a monitoring time interval $\Delta t$ at an instant $t_{n+1}$ and which determines the torque being transmitted by the friction clutch, in accordance with a function which excludes undesired events including gripping of the friction clutch; computing that gradient $\Delta X$ which is required in order to arrive at the desired value of the parameter X after elapse of the time interval $\Delta t$; incorporating the computed gradient $\Delta X$ by means of a hydraulic system by resorting to a proportionality regulation wherein the parameter is a pressure differential $\Delta p$ between two plenum chambers of the clutch and is determined in advance by the equation $\Delta P_{n+1}=(1-\beta)\cdot\Delta P_{Soll}+\beta\cdot\Delta Pn$, wherein $\beta=f(T_{v,t})$; and repeating the preceding series of steps to reach a desired value $X_{Soll}$.

26. The method of claim 20, wherein a new value of the torque being transmitted by the friction clutch which has been determined by the central computer unit in dependence upon a change of torque in the power train is selected by the steps of: computing a gradient $\Delta X$ of a selected parameter X, which determines the torque being transmitted by the friction clutch, in accordance with a function which excludes undesired events including short-lasting gripping of the friction clutch; applying a desired gradient $\Delta X$ by a hydraulic system whereby the gradient of a pressure differential $\Delta P$ between two plenum chambers of the clutch constitutes the parameter and is computed in accordance with the equation $\Delta\Delta P=C_1\cdot(\Delta P_{Soll}-\Delta P_n)$, wherein $C_1$ is a proportionality factor; and repeating the series of steps to reach a required desired value $X_{Soll}$.

27. The method of claim 20, wherein under operating conditions when a reduction of the input torque at the torque transmitting system is to be expected for at least one of a plurality of reasons including shifting from a higher gear to a lower gear and in response to hooking up additional aggregates, a potential short-lasting gripping of the friction clutch is counteracted by a reduction of the torque which is being transmitted by the friction clutch by reducing at least one of the torque division factor $k_c$ and the correction factor $k_{korr}$ by a predetermined value and thereupon increasing the at least one factor in accordance with a function in dependence on time to a value which is optimal for the isolation of vibrations and for the fuel economy.

28. The method of claim 20, wherein the correction factor $k_{korr}$ compensates for departures of the power train from an ideal condition by measuring said slippage within a fixed quasi stationary operating range and with a time delay for exclusion of oscillations; comparing the measured slippage with desired slippage values which ensures an optimal isolation of oscillations at a maximum possible fuel economy; and altering the factor $k_{korr}$ in the event of a difference between the desired and measured slippages.

29. The method of claim 20, wherein the prime mover is an engine of a vehicle and, in response to transmission of at least one signal denoting the desire of a driver of the vehicle for an acceleration, including a signal denoting the velocity of a change of the angle of a throttle valve, the slippage in the torque transmitting system is reduced by reducing at least one of the factor $k_c$ and the factor $k_{korr}$ so that an increase of torque offered by the power transmission can be utilized as a reserve of torque.

30. The method of claim 20, wherein the slippage in the torque transmitting system is automatically determined for all speed ratios, the efficiency of the transmission being secondary to a design of the power transmission ensuring a maximum possible torque conversion range.

31. A method of regulating a torque transmitting system which is operatively connected with an output of a prime mover, said prime mover having an operating condition and said torque transmitting system (a) being drivingly connected with an automatic transmission by an output shaft and (b) comprising a hydrodynamic power transmission, a friction clutch in parallel with the power transmission and a central computer unit, the application of a force to the friction clutch and hence a torque which is being transmitted by the friction clutch being variable under the influence of the central computer unit, said method comprising the steps of ascertaining the torque to be transmitted by the friction clutch in dependence upon the operating condition of the prime mover in accordance with the torque equation $M_{clutch}=k_c\cdot k_{korr}\cdot M_{prime\ mover}$ wherein $k_c=k_{mc}$ constituting a torque division factor and $k_{korr}$ is a correction factor, and computing, selecting and applying to the friction clutch that force which is required for the transmission of the ascertained clutch torque so that a slippage between an input and an output of the torque transmitting system is automatically determined in dependence upon the magnitude of the torque division factor $k_c$, which is independent of a characteristic diagram of the prime mover, and that the correction factor $k_{korr}$ compensates for deviations of a condition of the power train from an ideal condition.

32. A method of regulating a torque transmitting system which is operatively connected with an output of a prime mover, said prime mover having an operating condition and said torque transmitting system (a) being drivingly connected with an automatic transmission by an output shaft and (b) comprising a hydrodynamic power transmission, a friction clutch in parallel with the power transmission and a central computer unit arranged to regulate the application of a variable force to the friction clutch, and hence a torque which is being transmitted by the friction clutch, said method comprising the steps of ascertaining the torque to be transmitted by the friction clutch in dependence upon the operating condition of the prime mover in accordance with the torque equation $M_{clutch}=k_c\cdot k_{korr}\cdot M_{prime\ mover}$ wherein $k_c=k_{mc}$ constituting a torque division factor and $k_{korr}$ is a correction factor, and computing, selecting and applying to the friction clutch that force which is required for the transmission of the ascertained clutch torque so that a slippage between an input and an output of the torque transmission system is automatically determined in dependence upon the magnitude of the torque division factor $k_c$, which is dependent exclusively upon the RPM of the prime mover, and that the correction factor $k_{korr}$ compensates for deviations of the condition of the power train from an ideal condition.

33. A method of regulating a torque transmitting system which is operatively connected with an output of a prime mover, said prime mover having a variable operating condition and said torque transmitting system (a) being drivingly connected with an automatic transmission by an output shaft and (b) comprising a hydrodynamic power transmission, a friction clutch in parallel with the power transmission and a central computer unit arranged to regulate the application of a variable force to the friction clutch, and hence a torque which is being transmitted by the friction clutch, said method comprising the steps of ascertaining the torque to be transmitted by the friction clutch in dependence upon the operating condition of the prime mover in accordance with the torque equation $M_{clutch}=k_c\cdot k_{korr}\cdot M_{prime\ mover}$ wherein $k_c=k_{mc}$ constituting a torque division factor and $k_{korr}$ is a correction factor, and computing, and selecting and applying to the friction clutch that force which is required for the transmission of the ascertained clutch torque so that a slippage between an input and an output of the torque transmitting system is automatically determined in dependence upon the magnitude of the torque division factor $k_c$, which is a function of the RPM and of the torque of the prime mover, and that the correction factor $k_{korr}$ compensates for deviations of the condition of the power train from an ideal condition.

34. A lock-up clutch for a hydrodynamic power transmission in a torque transmitting system, comprising a pump wheel, a turbine wheel having a radially outer region, a guide wheel, a power transmission cover which is centered relative to a rotational axis, which is non-rotatably connected with the pump wheel and which surrounds the turbine wheel, an annular piston disposed and centered between the cover of the power transmission and the turbine wheel and having a radially outer portion constituting a conical clutch disc and a radially inner portion constituting a sealing hub mounted on a complementary sealing hub which is non-rotatably connected with the turbine wheel, and a damper unit having an input part non-rotatably connected to said piston and an output part non-rotatably connected with said radially outer region of said turbine wheel.

35. The lock-up clutch of claim 34, wherein the clutch disc constituted by said annular piston and a complementary friction surface of the cover of the power transmission, which friction surface cooperates with the clutch disc, constitute two cones which diverge in a direction away from the turbine wheel.

36. The lock-up clutch of claim 34 or 35, wherein at least one ring-shaped damper element of said damper unit is received circumferentially between said damper input part and said damper output part, the damper element being installed between said radially outer region of the turbine wheel and a friction surface of the clutch disc of the annular piston.

37. The lock-up clutch of claim 34, wherein the clutch disc constituted by said annular piston and a complementary friction surface of the cover of the power transmission, which friction surface cooperates with the clutch disc, constitute two cones which diverge in a direction toward the turbine wheel.

38. The lock-up clutch of claim 34, wherein the output part of the damper constitutes a ring-shaped part which is welded to the turbine wheel and comprises entraining fingers extending in a direction toward the clutch disc of the annular piston.

39. The lock-up clutch of claim 34, wherein the input part of the damper resembles a leaf spring which is non-rotatably connected with the annular piston and comprises arms which surround the resilient elements of the damper and project from that side of the friction disc of the clutch which faces away from the friction surface of the friction disc as well as entraining members disposed at a front face and supporting in the circumferential direction.

40. A torque transmitting system for a power train of a vehicle which is equipped with a variable-speed transmission, particularly a motor vehicle with a prime mover including a combustion engine, comprising: a hydrodynamic torque transmission which is connected to and is driven by said prime mover of the vehicle and has an output shaft operatively connecting it with a following automatic transmission; a friction clutch which is disposed in parallel with the hydrodynamic torque transmission, which is actuatable by a flowing pressurized fluid, and which is provided with a first plenum chamber between a turbine wheel of the power transmission and an annular piston which is operatively connected with a friction disc and with a second plenum chamber between the annular piston and a cover of the power transmission, said chambers being configurated in such a way that a pressure differential existing between said chambers determines the torque which can be transmitted by the friction clutch; a central computer unit; and a hydraulic system which can cooperate with the computer unit to bring about a directed change of the pressure differential between said chambers and hence a change of the torque adapted to be transmitted by the friction clutch, the friction clutch being regulated at all speed ratios and the power transmission having a torque conversion ratio>2.5.

41. A torque transmitting system according to claim 40, wherein the heat which develops when the vehicle is in use in extrapolated by the computer unit and the thus ascertained actual heat is compared with a maximum permissible heat for the torque transmitting system.

42. A torque transmitting system according to claim 40 or 41, further comprising clutch lock-up controls which, in the event of extreme driving conditions, alter a slippage between said piston and said cover to thus reduce the amount of developing heat.

43. A torque transmitting system according to claim 40, wherein with the exception of extreme situations including starting, acceleration and travel on mountain roads, the clutch is always operated with relatively small slippage.

44. A torque transmitting system according to claim 40, wherein a damper unit which is operative between the turbine of the power transmission and the friction disc of the clutch is set up for a partial load range.

45. A torque transmitting system for the power train of a vehicle which is equipped with an automatic variable-speed transmission and with a drive, comprising: a hydrodynamic torque transmission which is driven by a power train of the vehicle and is operatively connected with said automatic transmission; a friction clutch which is disposed in parallel with the hydrodynamic torque transmission, said friction clutch being actuatable by a flowing pressurized fluid and being provided with a first plenum chamber between a turbine wheel of the torque transmission and an annular piston which cooperates with a friction disc, and with a second plenum chamber between the annular piston and a cover of the torque transmission, the chambers being configurated in such a way that a pressure differential existing between said chambers determines the torque which can be transmitted by the friction clutch; a central computer unit; and a hydraulic system adapted to cooperate with the computer unit to bring about a directed change of the pressure differential between said chambers and hence a change of the torque adapted to be transmitted by the friction clutch, said friction clutch being operated in such a way that a partial engagement between said piston and said friction disc takes place, at least at times, at all forward speeds.

* * * * *